US010056006B1

(12) United States Patent
Hsu-Hoffman et al.

(10) Patent No.: US 10,056,006 B1
(45) Date of Patent: Aug. 21, 2018

(54) PRE-LICENSE DEVELOPMENT TOOL

(71) Applicant: Allstate Insurance Company, Northbrook, IL (US)

(72) Inventors: Chienlan Hsu-Hoffman, Palo Alto, CA (US); Evan Gibbs, Daly City, CA (US); Alicia Dornadic, Belmont, CA (US); Regina Madigan, Mountain View, CA (US); Maryam Zahedi, Portola Valley, CA (US); Taylor Parsell, Berkeley, CA (US)

(73) Assignee: Allstate Insurance Company, Northbrook, IL (US)

( * ) Notice: Subject to any disclaimer, the term of this patent is extended or adjusted under 35 U.S.C. 154(b) by 686 days.

(21) Appl. No.: 14/522,197

(22) Filed: Oct. 23, 2014

Related U.S. Application Data

(63) Continuation-in-part of application No. 13/826,890, filed on Mar. 14, 2013, now Pat. No. 9,607,526.

(60) Provisional application No. 62/011,320, filed on Jun. 12, 2014.

(51) Int. Cl.
*G09B 9/04* (2006.01)
*G09B 9/052* (2006.01)

(52) U.S. Cl.
CPC .................................. *G09B 9/052* (2013.01)

(58) Field of Classification Search
CPC .... G09B 19/167; G09B 9/05; A63F 2009/246
USPC ....................... 434/62–66, 69, 247
See application file for complete search history.

(56) References Cited

U.S. PATENT DOCUMENTS

| | | | |
|---|---|---|---|
| 6,461,238 B1 | 10/2002 | Rehkemper et al. |
| 7,269,539 B2 | 9/2007 | Wang |
| 7,349,830 B2 | 3/2008 | Gilbert et al. |
| 7,610,558 B2 | 10/2009 | Morita |
| 8,425,289 B2 | 4/2013 | Beggs |
| 2002/0090985 A1 | 7/2002 | Tochner et al. |

(Continued)

FOREIGN PATENT DOCUMENTS

WO 01/058548 A1 8/2001

OTHER PUBLICATIONS

Non Final Office Action dated Jul. 1, 2015 U.S. Appl. No. 14/038,982.

(Continued)

*Primary Examiner* — Jerry-Daryl Fletcher
(74) *Attorney, Agent, or Firm* — Banner & Witcoff, Ltd.

(57) ABSTRACT

Methods, computer-readable media, software, and apparatuses provide a tool for use by drivers and/or coaches throughout the pre-license stage of obtaining a driver's license. A pre-license program may control a computing device to collect drive data while a driver is driving a vehicle. This drive data may be used to detect a drive event. Then, the computing device may present coaching information associated with the detected drive event. The coaching information may provide a passenger, such as a coach or parent, with real-time advice for instructing the driver how to improve his/her driving skills. Moreover, the drive data collected may be used to prepare reports providing feedback to the drivers and coaches. Further, the pre-license program may determine an expected track for a driver to follow to prepare for a driver's license test and may indicate whether the driver is on or off the track.

20 Claims, 18 Drawing Sheets

(56) References Cited

U.S. PATENT DOCUMENTS

| | | | |
|---|---|---|---|
| 2004/0241629 A1* | 12/2004 | Ondrusz | A63B 24/0062 434/247 |
| 2008/0022211 A1 | 1/2008 | Jones et al. | |
| 2008/0081694 A1 | 4/2008 | Hong et al. | |
| 2008/0280684 A1 | 11/2008 | McBride et al. | |
| 2009/0069156 A1* | 3/2009 | Kurunmaki | A63B 24/0062 482/9 |
| 2010/0160013 A1 | 6/2010 | Sanders | |
| 2011/0258044 A1 | 10/2011 | Kargupta | |
| 2012/0053805 A1 | 3/2012 | Dantu | |
| 2012/0100509 A1 | 4/2012 | Gunderson et al. | |
| 2012/0135382 A1 | 5/2012 | Winston et al. | |
| 2012/0215375 A1 | 8/2012 | Chang | |
| 2012/0221216 A1 | 8/2012 | Chauncey et al. | |
| 2012/0251990 A1* | 10/2012 | Urbanowski | G06F 19/3481 434/247 |
| 2013/0017891 A1 | 1/2013 | Romero et al. | |
| 2013/0141249 A1 | 6/2013 | Pearlman et al. | |
| 2013/0316311 A1 | 11/2013 | England | |
| 2014/0125678 A1 | 5/2014 | Wang et al. | |
| 2014/0193781 A1* | 7/2014 | Sands | G09B 19/167 434/64 |

OTHER PUBLICATIONS

Office Action dated Apr. 17, 2015 in related U.S. Appl. No. 13/826,890.
Non-Final Office Action dated Oct. 7, 2015 in U.S. Appl. No. 13/826,890.
Feb. 2, 2016—Final Office Action—U.S. Appl. No. 14/038,982.
Apr. 5, 2016—(US) Office Action—U.S. Appl. No. 13/826,890.
May 5, 2016—(US) Office Action—U.S. Appl. No. 13/826,429.
Aug. 23, 2016—(US) Notice of Allowance—U.S. Appl. No. 13/826,890.
Aug. 26, 2016—(US) Non-Final Office Action—U.S. Appl. No. 14/038,982.
Nov. 8, 2016—(US) Office Action—U.S. Appl. No. 13/826,429.
Nov. 18, 2016—(US) Notice of allowance—U.S. Appl. No. 13/826,890.
Dec. 19, 2016—(US) Final Office Action—U.S. Appl. No. 14/038,982.
Feb. 28, 2017—(US) Notice of Allowance—U.S. Appl. No. 13/826,429.
"Apps for Vehicles Challenge: Final Round (/),"http://vehicles.challenge.gov/submissions/13988-green-button-gamer-driver-challenge?sso=3f2c998e9f665c6c7266ec2622537b2e5c5c934 fbd965ede16c8b6710a93932b8f662e0f82f67b24e7e9f07d13f 66998376c. (last retrieved Jul. 25, 2013).
US Non Final Office Action for U.S. Appl. No. 13/826,890 dated Oct. 2, 2014.
US Non Final Office Action for U.S. Appl. No. 13/826,429 dated Oct. 1, 2014.
Rick Broida, "Road Wars app turns safe driving into a game," CNET Reviews, Nov. 15, 2013, http://reviews.cnet.com/8301-19512_7-57612558-233/road-wars-app-turns-safe-driving-into-a-game/.
Final Office Action dated Jul. 28, 2015 in U.S. Appl. No. 13/826,429.
Jul. 11, 2017—(US) Notice of Allowance—U.S. Appl. No. 14/038,982.
Aug. 7, 2017—(US) Non-Final Office Action—U.S. Appl. No. 15/434,560.
Sep. 21, 2017—(US) Notice of Allowance—U.S. Appl. No. 14/038,982.
Nov. 8, 2017—Notice of Allowance—U.S. Appl. No. 14/038,982.
Nov. 29, 2017—Notice of Allowance—U.S. Appl. No. 15/434,560.

* cited by examiner

PRE-LICENSE DEVELOPMENT TOOL

FIELD OF ART

This application is a non-provisional application of and claims priority to U.S. Patent Application No. 62/011,320, filed on Jun. 12, 2014, and is a continuation-in-part of and claims priority to U.S. patent application Ser. No. 13/826,890, filed on Mar. 14, 2013, which are hereby incorporated by reference in their entirety herein.

FIELD OF ART

Aspects of the disclosure generally relate to computer systems and computer software. More particularly, aspects of this disclosure provide a tool for generating feedback for drivers seeking their driver's license and assisting others to instruct the drivers throughout the pre-license stage.

BACKGROUND

Car accidents are a common cause of injury and damage, and the costs resulting from car accidents can be significant. The frequency of car accidents is especially high for young and/or novice drivers. There is a demand to reduce the number of accidents among this group of drivers. In the United States, many states require mandatory training for new drivers. This training may include attending classes and/or taking a driving course with a certified instructor. Further, in many states, prior to obtaining a driver's license, users may receive a driving permit that allows them to drive as long as another person with a valid driver's license is in the vehicle. Often this other person is asked or desires to teach the driver to drive. However, this other person might not know how to teach the driver or might want advice on how to teach the driver.

Accordingly, new systems, devices, methodologies, and software are desired to provide teaching assistance to passengers, such as parents, driving coaches, etc., to aid in teaching novice drivers, such as teenagers, how to drive. New systems, devices, methodologies, and software are likewise desired to teach drivers to drive better and more safely.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for providing a tool that tracks progression of driving skills and experience of a student (e.g., a teenager) as he/she learns to drive. The tool further presents coaching advice to coaches (e.g., parents, friends, etc.) in real-time while the student is driving and feedback to students for their review after driving.

Aspects of this disclosure provide computer readable media storing computer-executable instructions that, when executed, cause a computing device (e.g., a parent's smartphone) to collect drive data (e.g., acceleration, deceleration, g-force, time of day, etc.) while a driver is driving a vehicle, detect a drive event based on the drive data, and present coaching information associated with the drive event in response to detecting the drive event. A drive event may be, for example, a brake event or turn event or any behavior or pattern exhibited by a driver while driving. The computer-executable instructions may further cause the computing device to determine the coaching information based on driver information associated with the driver and/or information associated with the coach (e.g., information indicating whether a coach overreacts and/or a degree to which the coach overreacts). In some cases, this driver information may be retrieved from another computing device associated with the driver (e.g., a smartphone of the driver). During the drive, the computer-executable instructions may further cause the computing device to receive a user request for coaching information and may present the requested coaching information. Also during the drive, the computer-executable instructions may further cause the computing device to predict a future drive event, such as an upcoming brake event and/or upcoming turn event. In response to predicting a future drive event, the computer-executable instructions may cause the computing device to present coaching information for the predicted future drive event. After the drive, the coach's (e.g., parent's) smartphone may transmit the coaching information to the driver's smartphone, so the driver may review the coaching information. Aspects of the disclosure also provide the computing device or apparatus including the computer readable media storing such computer-executable instructions. The computing device or apparatus may be a smartphone, tablet, laptop, vehicle's computing device (including a vehicle's in-dash display screen), etc.

Aspects of the disclosure further provide a method of collecting drive data while a driver is driving a vehicle, detecting a drive event (e.g., brake event, turn event, etc.) based on the drive data, and presenting coaching information associated with the drive event in response to detecting the drive event. This method may further include retrieving driver information from another computing device associated with the driver (e.g., a driver's smartphone), determining the coaching information based on the driver information associated with the driver, and transmitting the coaching information to the driver's smartphone. The method may also include receiving a user request for a second piece of coaching information, and presenting the second piece of coaching information. Further, the method may include providing a suggested route, predicting a future drive event using map information of the suggested route, and presenting additional coaching information associated with the future drive event in response to predicting the future drive event. Still, in some examples, the method may also include recording audio within the vehicle while the driver is driving, and transmitting the recording to another computing device after the drive.

In addition, aspects of this disclosure provide a non-transitory computer readable storage medium storing a pre-license program. The pre-license program may include computer-executable instructions that, when executed, cause a computing device to receive a target driver's license test date (e.g., a date on which a student/teen aims to take a driver's license test provided by, for example, a department of motor vehicles (DMV) of a state); determine a total number of days until the target driver's license test date; and indicate whether a driver is on track to reach a target skill level by the target driver's license test date. The instructions, when executed, may also cause the computing device to prompt a user for the target driver's license test date during registration of the computer-executable instructions. The instructions, when executed, may also cause the computing device to divide the total number of days into a plurality of groups, wherein each of the plurality of groups is associated with a skill level (e.g., level one, level two, etc.). The total number of days may be divided according to an algorithm that sets forth percentages (e.g., ratios, fractions, etc.) of the total number of days to be assigned to the plurality of groups, respectively. For example, the algorithm may cause the first 10% of the total number of days to be assigned to level one, the next 25% (e.g., the 25% after the 10%) of the total number of days to be assigned to level two, and so on until all days are assigned to one of the levels. Any number of levels may be implemented.

In some embodiments, indicating that the driver is not on track (e.g., not on pace) to reach the target skill level by the target driver's license test date may comprise displaying a calendar using one color to indicate a projected skill level associated with a present date and another color to indicate an actual skill level associated with the present date. Additionally, or alternatively, in some embodiments, indicating that the driver is not on track to reach the target skill level by the target driver's license test date may comprise displaying a circle graph that is shaded in a clockwise direction according to an actual skill level of the driver; and displaying a marker on the circle graph showing a projected skill level at a present date. In some embodiments, indicating that the driver is on track to reach the target skill level by the target driver's license test date may comprise displaying a circle graph that is shaded in a clockwise direction according to a skill level of the driver; and displaying a marker (e.g., an icon indicating the present date) over a shaded portion of the circle graph.

Further, the computer-executable instructions, when executed, may cause the computing device to determine a skill level of the driver with respect to each of a plurality of test skills; and display the skill level of the driver with respect to each of the plurality of test skills by shading an area associated with the plurality of test skills, respectively. The computer-executable instructions may also cause the computing device to present a screen that allows a user to change the plurality of test skills. In some embodiments, the computer-executable instructions may cause the computing device to provide tip information to a user of the computing device, for example, in response to a selection indicating the driver is starting a drive. When executed, the computer-executable instructions may further cause the computing device to determine a weakest skill (or other driving skills needing improvement) of the driver among a set of skills to be tested during the drive. Is such a case, the tip information may include information related to improving the weakest skill. The computer-executable instructions may further cause the computing device to start a timer to time the drive, wherein the timer is started in response to the selection. Moreover, the computer-executable instructions may cause the computing device to prompt a user of the computing device to provide a score for each of a plurality of test skills to be tested during a drive performed by the driver.

Aspects of the disclosure also include an apparatus comprising an interface configured to interface with an input device, at least one processor, and memory storing computer-executable instructions. The computer-executable instructions may cause this apparatus to receive a test date via the interface; determine a set of days from a date on which the test date is received until the test date; and assign one of a plurality of levels to each day of the set of days; and responsive to execution of the computer-executable instructions on a particular day of the set of days, indicate a first level assigned to the particular day (e.g., indicate level two if the user is projected to be on level two on the particular day) and a second level representing a driver's skills as of the particular day (e.g., indicate level one if the user is actually at level one on the particular day), the first level and the second level being different levels of the plurality of levels. The computer-executable instructions may further cause this apparatus to determine whether a present skill level of the driver is behind an expected skill level of the driver by more than a threshold; and output a notification, via the interface, indicating that the driver is behind the expected skill level in response to determining that the present skill level of the driver is behind the expected skill level of the driver by more than the threshold. The computer-executable instructions may further cause this apparatus to determine a skill level of the driver with respect to a particular driving skill based at least on a score received for the particular driving skill. Also, the skill level of the driver with respect to the particular driving skill may be further determined based at least on a duration of a drive, weather, time of day, sound, or other factors associated with the score. The computer-executable instructions may further cause this apparatus to output a pie chart comprising a pie slice associated with the particular driving skill, wherein the pie slice is shaded, filled, or otherwise modified according to the skill level of the driver.

Aspects of the disclosure also include a method of scoring and tracking a progress of a student/teen preparing for a driver's license test. The method may include a step of receiving a plurality of scores for a plurality of driving skills, respectively. The method may also include a step of determining an overall skill level of a driver based on the plurality of scores. Further, the method may include a step of comparing, by a computing device, the overall skill level with a target overall skill level to determine a percentage of the target overall skill level reached by the driver. And, the method may include outputting a graph illustrating the percentage. The method may also include one or more of the following steps of determining whether an option to start a drive is selected; determining whether a user of the computing device is a coach, parent, or other licensed and/or qualified person in response to determining that the option to start the drive is selected; prompting the user to switch in response to determining that the user is a student or teen; providing tip information in response to determining that the option to start the drive is selected; starting a timer in response to determining that the option to start the drive is selected; stopping the timer in response to determining that a second option to end the drive is selected; and outputting a screen to capture the plurality of scores.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited in the accompanying figures in which like reference numerals indicate similar elements and in which.

DETAILED DESCRIPTION

Figure 1:
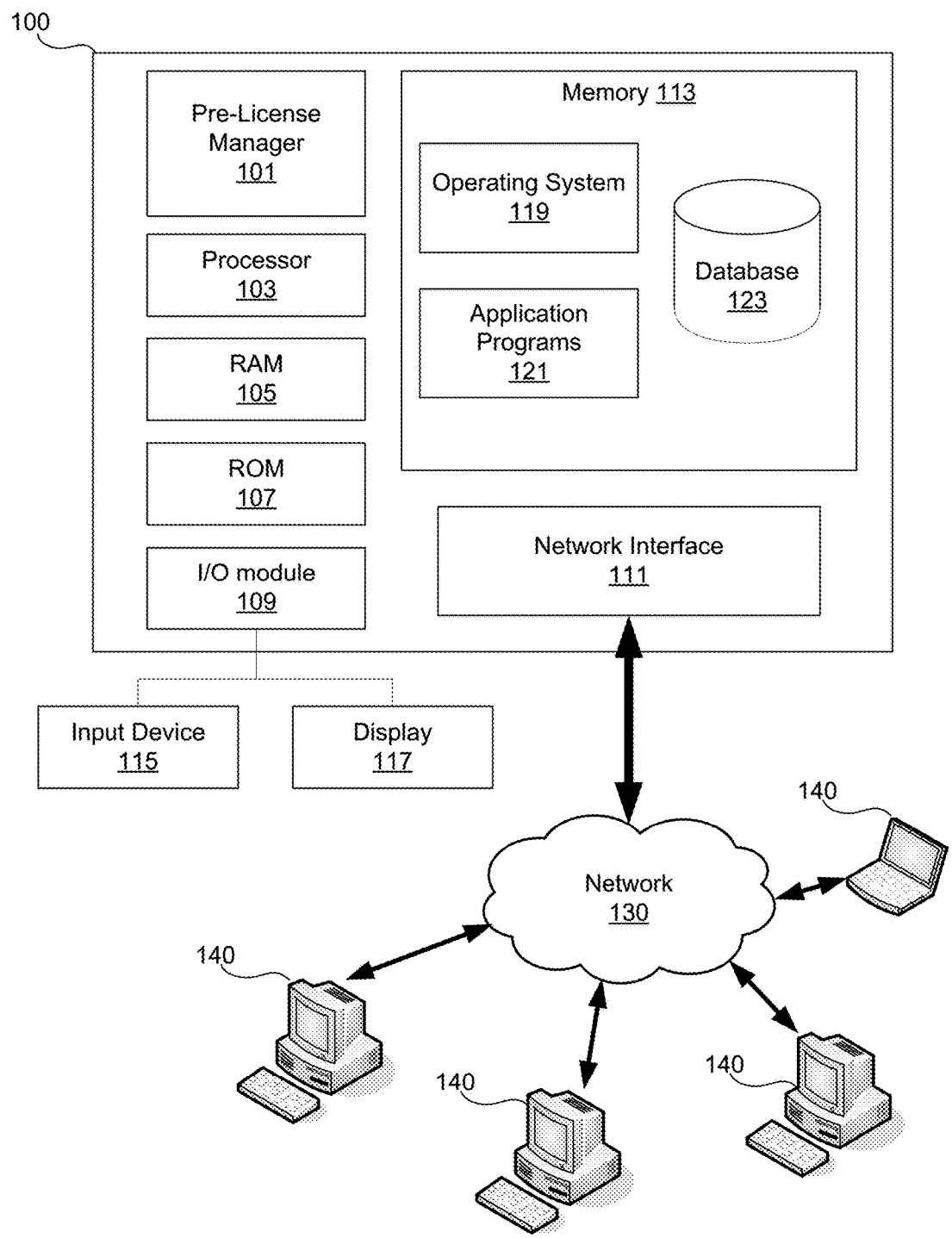
FIG. 1 is a block diagram of an example computing device that may be used according to an illustrative embodiment of the present disclosure.

In accordance with various aspects of the disclosure, methods, computer-readable media, software, and apparatuses are disclosed that provide a suite of pre-license applications that drivers, coaches, and vehicles may execute to provide an enhanced driver education experience. A pre-license coach application may execute on a passenger's user device, e.g., a smartphone, to collect drive data as a driver is practicing driving, and to present coaching information that the passenger may use to coach the driver during the drive. The pre-license coach application may give specific coaching information based on events occurring during the drive. For example, the pre-license coach application may detect a brake event and/or turn event, and provide coaching information to the passenger so that the passenger may teach (or coach) the driver about braking and/or turning, respectively.

Meanwhile, a pre-license driver application may execute on a driver's user device, e.g., a smartphone, to collect drive data as the driver is driving. The pre-license driver application may then later present the drive data to the driver so that he/she can learn about their driving skills and improve their driving skills. The pre-license driver application may also present coaching information to educate the driver on how to improve. In some cases, the pre-license driver application may cause the driver's user device to output audible coaching information thereby performing similar coaching functions that the pre-license coach application causes the passenger's user device to perform.

Additionally, a pre-license vehicle application may execute on a vehicle's computing device to collect data about a drive as well. The pre-license vehicle application may allow the vehicle's computing device to communicate with the driver's user device and/or passenger's user device. In particular, the pre-license vehicle application may transmit data collected during a drive to the driver's user device and/or passenger's user device. In some cases, the pre-license vehicle application may cause the vehicle's computing device to perform the same coaching functions that the pre-license coach application causes the passenger's user device to perform. Thus, the vehicle's computing device may present coaching information to the passenger that the passenger may use to teach the driver. Still, in some cases, the pre-license vehicle application may cause the vehicle's computing device to present the coaching information directly to the driver.

Although a suite of pre-license applications (e.g., pre-license driver application, pre-license coach application, and pre-license vehicle application) are described above, these applications may be implemented as a single application. That is, a single application, herein referred to as the pre-license program, may be executed on various computing devices which may perform particular modules of the pre-license program. As such, aspects of the disclosure may be implemented by a one of or any combination of various computing devices (e.g., a driver's computing device, passenger's computing device, or vehicle's computing device) operating in tandem.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made. Furthermore, the disclosures of each of the following patent applications are incorporated by reference herein in their entirety: U.S. patent application Ser. No. 13/216,849, filed Aug. 24, 2011, entitled "In Vehicle Driver Feedback Device;" and the U.S. patent application Ser. No. 13/826,429, filed Mar. 14, 2013, entitled "Interactive Driver Development."

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a pre-license manager 101 for performing methods and executing instructions of the pre-license program described herein. The pre-license manager 101 may be implemented with a processor and memory and/or ASIC. Throughout this disclosure, the pre-license manager 101 may be used to reference a combination of the processor and memory storing instructions executed by that processor and/or the instructions themselves. The processor of the pre-license manager 101 may operate in addition to or in conjunction with another processor 103 of the computing device 100. Both the pre-license manager 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system administrators may update various aspects of the pre-license program, such as rules for detecting drive events and what coaching information to provide in response to which drive events, described in further detail below. On some computing devices 100, the input device 115 may be operated by users to interact with the pre-license program, including providing user information, assessing a driver's performance, reviewing a driver's performance, etc., as described in further detail below. Meanwhile, the display device 117 may assist the system administrators and users to confirm/appreciate their inputs.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment or peer-to-peer network in which data resides on one computing device and links directly or indirectly to other computing devices which may hold additional or complimentary data.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

The computing device 100 may be a mobile device (e.g., a smartphone), and thus, may also include various other components, such as a battery, speaker, and antennas (not shown).

Figure 2:
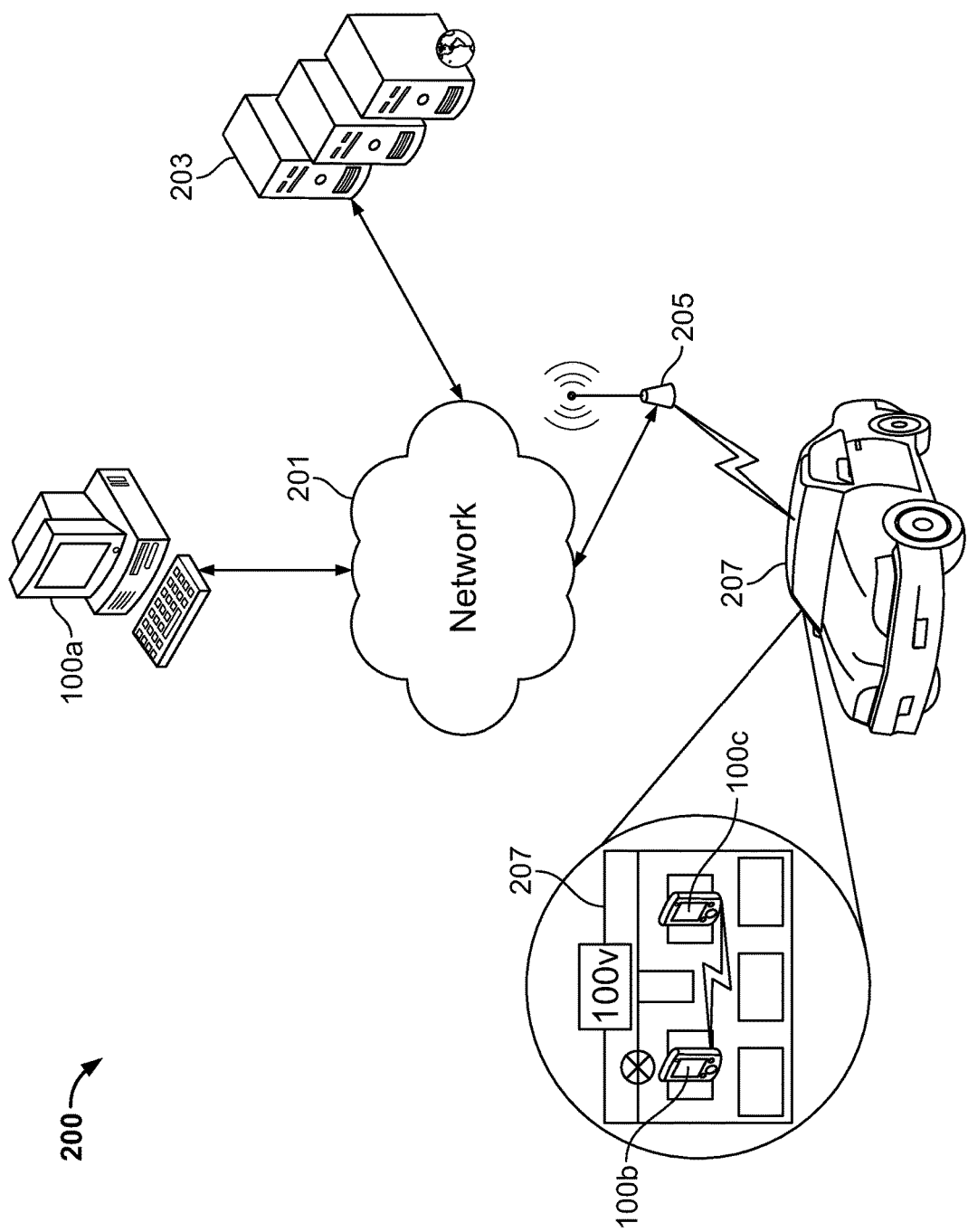
FIG. 2 illustrates an example network environment for implementing methods according to the present disclosure.

The pre-license program disclosed herein may be implemented on a computing device 100 used in various network environments. FIG. 2 illustrates an example network environment 200 for implementing methods according to the present disclosure. As shown in FIG. 2, the network environment 200 may include a network 201 configured to connect one or more administrative computing devices 100a, one or more student computing devices 100b, one or more coach computing devices 100c, and one or more vehicle computing devices 100v. The network 201 may also provide a path for connecting to application servers 203. The network 201 may be any type of network, like the network 130 described above. In particular, the network 201 may include a cellular network and its components, such as base stations, cell towers, etc. The network environment 200 may include access points 205 to extend the network 201 to reach mobile computing devices. The access points 205 may include cellular network components (e.g., cell towers, base stations, etc.), global positions system components (e.g., antennas, satellites, etc.), and other wireless access components (e.g., routers) for connecting the student computing devices 100b, coach computing devices 100c, and/or vehicle computing devices 100v to the network 201. As such, through the network 200, the student computing devices 100b, coach computing devices 100c, and/or vehicle computing devices 100v may communicate with application servers 203 to obtain various information, such as coaching information, driving statistics, maps, the time of day, weather information, traffic information, position information, software updates, etc.

In some embodiments, one or more of the application servers 203 may be configured to provide a service that receives user drive data so that users can review their drive data. For example, an application server 203 may host a website that users can visit to see their drive data and possibly the drive data of others. In some examples, the drive data of a group of students (e.g., students in the same driving school) may be grouped together. An application server 203 may provide a webpage that ranks students within their group (e.g., driving school) and/or that ranks groups (e.g., driving schools) based on the performance of their students. Coaches may also access this service to see what skills of their students should get more attention.

Referring to FIG. 2, the administrative computing device 100a may be configured to generate, edit, manage, and deliver the suite of pre-license applications (e.g., pre-license driver application, pre-license coach application, pre-license vehicle application, etc.) or pre-license program. The suite of pre-license applications or pre-license program may be downloaded, installed, and executed on one or more student computing devices 100b, coach computing devices 100c, and/or vehicle computing devices 100v. In some examples, the administrative computing device 100a may execute the pre-license program in tandem with a student computing device 100b, coach computing device 100c, and/or vehicle computing device 100v. The server-side computing device 100a may, for example, render graphics and webpages which are then streamed to these other computing devices 100b, 100c, 100v which may be used to supply user inputs so that the user may interact with the pre-license program. As shown in FIG. 2, the student computing device 100b and coach computing device 100c may be a portable user device, such as a smartphone, tablet, laptop, etc., that a user may take with them into a vehicle 207. Although FIG. 2 shows the vehicle 207 as being a car, the vehicle 207 may be a motorcycle, truck, bus, boat, plane, etc.

When the student computing device 100b and coach computing device 100c are inside or near the vehicle 207, they may communicate with the vehicle computing device 100v. In some examples, the vehicle computing device 100v may include the vehicle's on-board diagnostic (OBD) system. The student computing device 100b and/or coach computing device 100c may communicate with the vehicle computing device 100v via a wired connection (e.g., USB, OBD II connector, etc.) or a wireless connection (e.g., Bluetooth).

FIG. 2 includes an exploded view of the inside of the vehicle 207 to illustrate example operating positions and lines of communication of the various computing devices. As shown, the driver, also referred to as the student since the driver may be learning to drive, may position his/her phone (an example of a student computing device 100b) on a center console or other flat surface within the vehicle 207. In some cases, the student computing device 100b may be positioned out of reach and/or view of the driver during the drive as the driver may be expected to focus on driving and not on using the student computing device 100b. Meanwhile, a passenger (e.g., a parent, coach, etc.) of the vehicle 207, who intends to teach the student how to drive or how to improve at driving, may hold or otherwise position his/her phone (an example of a coach computing device 100c) so that he/she may view its screen, hear audio from its microphone, and/or provide user inputs via its keypad, buttons, etc. Thus, when the coach computing device 100c presents coaching information, the passenger (or coach) may provide verbal feedback to the student about his/her driving.

In some cases, instead of, or in addition to, receiving coaching information through their coach computing device 100c, the passenger might receive the coaching information from the vehicle computing device 100v via a display of the vehicle 207. The vehicle computing device 100c may be installed behind the dashboard of a vehicle 207 (or elsewhere in the vehicle). The driver or passenger may interface with the vehicle computing device 100v by operating buttons on the dashboard, touching a display on the dashboard, or providing verbal commands.

Figure 3:
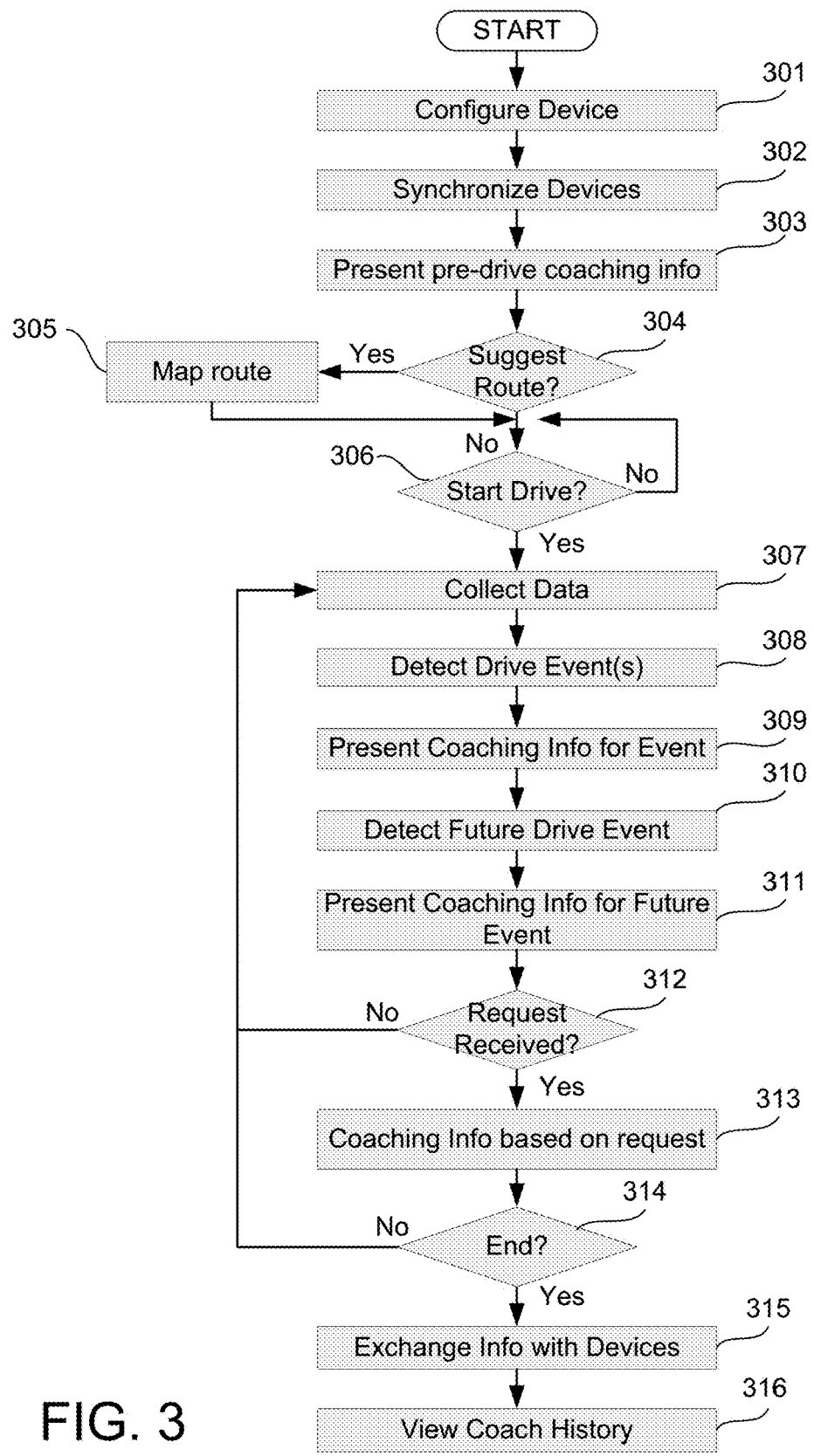
FIG. 3 illustrates a flow diagram of an example process in accordance with aspects of the present disclosure.

FIG. 3 illustrates a flow diagram for an example process in accordance with aspects of the present disclosure. More specifically, FIG. 3 illustrates a plurality of steps a coach computing device 100c may perform to provide a passenger with coaching information that the passenger may use to give advice to a student driver while driving. One or more of the steps of FIG. 3 may be performed as a result of executing the pre-license program on the coach computing device 100c.

As shown in FIG. 3, the process may begin with a step of configuring the coach computing device 100c in step 301. Configuring the coach computing device 100c may include downloading and installing the pre-license program. Further, it may include entering information about the driver and/or coach. For example, a user may enter the age of the driver, the gender of the driver, the state the driver has a driver's permit in (or the state that the driver intends to get his/her license in), a date in which the user received his/her driver's permit, a date the user expects to take a driver's test to receive a full license, etc. With regards to the coach, the user may enter the coach's age, coach's gender, coach's driver license number, coach's insurance policy number, etc. At step 301, the user may also enter information about the vehicle, such as the make, model, and year of the vehicle.

Additionally, configuration may include registering the coach computing device 100c with an application server 203 so that the coach computing device 100c may receive data to carry out certain aspects of the coaching process. For example, the coach computing device 100c may register with an application server 203 to receive coaching information or statistics related to other drivers and coaches so that driving and coaching performance can be compared to others. Registration may include creating a username and password to be associated with the coach and/or an account (e.g., insurance account) of the coach. Such registration may be performed through a web portal, which may be accessed through the pre-license program. The registration process may also result in creating a web page, hosted by the administrative computing device 100a or application server 203, to which the coach computing device 100c may upload information, such as coaching information, and pictures.

At step 302, the coach computing device 100c may synchronize with the student computing device 100b and/or vehicle computing device 100d. Synchronization may include establishing a connection (e.g., a Bluetooth connection) for communicating information between the devices. In some cases, synchronization may also include establishing a reference time so that data on one device may be correlated with data on another device. For example, synchronization may include establishing a reference time so that the time at which a driver made a left turn can be correlated with the time at which a coach told the user to look out for other vehicles or with the time at which the vehicle's left turn signal was activated.

In step 303, the coach computing device 100c may present pre-drive coaching information. This may include displaying a checklist of things a student should do before beginning to drive. For example, the checklist may include checking/adjusting mirrors, buckling a seatbelt, reminding passengers to buckle seatbelts, checking tires, checking oil, etc. The checklist may be interactive so that the coach may check off items in the checklist as the driver performs them. The coach computing device 100c could also connect with the vehicle computing device 100v or another computing device to receive data regarding whether checklist items have been completed, and have those items automatically checked off if completed.

Additionally, the pre-drive coaching information may include advice for the driver regarding an upcoming drive. For example, the pre-drive coaching information may include advising the driver to focus on braking earlier or going through turns at slower speeds. In some cases, the pre-drive coaching information may be customized for the particular driver based on the driver's driving history. For example, if it is determined that the driver previously had difficulty braking smoothly, the pre-driving coaching information may inform the coach to remind the driver that the driver should focus on braking smoothly. Or, if the driver's past performances indicate that he/she has done well with turning at slow speeds, the pre-driving information may suggest advising the driver to work on turning at higher speeds in order to advance the driver's skills.

Step 304 may include prompting the user to determine if the user would like a suggested route. Some coaches may desire assistance picking routes suited for the driver or routes that give the driver various driving experiences. For example, a coach may want to take a route that has less traffic so that the student can practice without the added pressure of other drivers. Or, a coach might want the student to practice driving in certain conditions, e.g., driving on a highway, if the student has not had much experience in such conditions. When prompting the user at step 304, the pre-license program may give the user a number of options for the user to select (e.g., less traffic, slower speeds, total drive time, etc.) that the pre-license program may consider when mapping a suggested route.

If the coach agrees to receive a suggested route (Yes at 304), the pre-license program may map one or more suggested routes at step 305. In mapping suggested routes, the pre-license program may consider the driver's history. For example, the pre-license program may determine that the driver is ready to practice driving on the highway, and may suggest a route that includes driving on a highway. Or, the pre-license program may determine that the driver needs more practice braking, and thus, may suggest a route that would require more stops. To aid in suggesting routes, the pre-license program may evaluate maps from third party entities (e.g., Google Maps, Yahoo Maps, etc.). For example, if the pre-license program determines that the user should practice merging onto a highway, the pre-license program may analyze map data to determine where a nearby highway merger exists.

In step 306, the coach computing device 100*c* may determine whether to start collecting data for a drive. A user may indicate that a drive is starting by pressing a button or otherwise making a user selection on the coach computing device 100*c* to indicate that the drive is starting. In some cases, step 306 may require the user to perform a calibration process in which the user places the phone on a flat surface in a stable, non-moving position. The coach computing device 100*c* may then establish a reference orientation and speed so that it can begin collecting data using its GPS, 3-axis accelerometer, gyroscope, etc.

The pre-license program may begin to collect drive data, such as vehicle telematics data, at step 307. In particular, the pre-license program may read data from the coach computing device's 100*c* 3-axis accelerometer, gyroscope, and/or GPS at step 307 to collect some types of drive data, such as acceleration, deceleration, g-force, speed, etc. For example, the 3-axis accelerometer of the coach computing device 100*c* may output the value of acceleration in an x-direction that the pre-license program may equate to an acceleration of the vehicle in a forward direction. Thus, pre-license program may use capabilities of the coach computing device 100*c* to get drive data. Notably, drive data is not limited to types of movement data or vehicle telematics data, and may include any type of data related to the drive, such as time of day information, day or night information, weather conditions during the drive, road conditions (e.g., side road or highway), traffic conditions (e.g., light, medium, heavy, etc.), position information, etc. Some types of drive data, e.g., time of day, may be received from the coach computing device 100*c*, while other types may be received from one or more application servers 203 in communication with the coach computing device 100*c*.

Additionally, or alternatively, the pre-license program may collect drive data from the student computing device 100*b*. Specifically, data from a 3-axis accelerometer, gyroscope, and/or GPS of a student computing device 100*b* may be transmitted from the student computing device 100*c* to the coach computing device 100*c*. Therefore, the coach computing device 100*c* might not use its own components to get the drive data. For example, if the user (coach) of the coach computing device 100*c* is moving the coach computing device 100*c* because, e.g., the coach is reading coaching information, talking on the phone, etc., the coach computing device 100*c* may choose to use drive data from the student computing device 100*b* rather than its own drive data. However, in some cases, the pre-license program executing on the coach computing device 100*c* may consider drive data from both the coach computing device 100*c* and the student computing device 100*b*. For example, the pre-license program may compare the data generated by a 3-axis accelerometer of the same device, that is, the coach computing device 100*c*, with data generated by a 3-axis accelerometer of a student computing device 100*b* to determine more accurate drive data. In some examples, the coach computing device 100*c* may determine to average or otherwise merge the results.

Further, in addition to, or instead of, receiving drive data from the student computing device 100*b*, the coach computing device 100*c* may receive drive data, including, e.g., vehicle telematics data, from the vehicle computing device 100*v*. Specifically, the pre-license program may cause the coach computing device 100*c* to query the vehicle computing device 100*v* of the vehicle 207 that it is inside to provide it with drive data. The vehicle computing device 100*v* may then transmit drive data that it has collected. Some vehicles may be equipped with sensors, 3-axis accelerometers, gyroscopes, GPS, etc. that provide them with drive data that can be used by the pre-license program for detecting events. The coach computing device 100*c* may receive drive data from the vehicle computing device 100*v* via a wireless connection (e.g., Bluetooth) or a wired connection (e.g., OBD II connector).

As the coach computing device 100*c* receives/collects drive data, the pre-license program may analyze the data to detect drive events at step 308. A variety of drive events may be detected at step 308. The drive events may be related to driving maneuvers (e.g., braking, turning, accelerating, decelerating, swerving, changing lanes, parking, tailgating, etc.). For example, vehicle telematics data may be analyzed to detect some types of drive events. Further, some drive events may be related to driving characteristics (e.g., driving speed, a level of alertness of driver, distractions during driving, etc.). For example, the pre-license program may detect that the driver is speeding based on speed limit information. In another example, cameras monitoring the driver's eyes or head position may provide information that the pre-license program may use to detect that the driver is not focusing on the road. Yet another example may include analyzing setting changes (e.g., changing a radio station or volume, answering a phone, sending a text message, etc.), to detect a drive event indicating that the driver may have been distracted during the drive. Additionally, some drive events may be related to driving conditions (e.g., time of day, weather conditions, road conditions, traffic conditions, etc.). For example, the pre-license program may use weather information obtained during the drive to determine that it is raining during the drive.

In particular, in step 308, the pre-license program may detect whether a brake event occurred based on data collected at step 307. Specifically, the pre-license program may use one or more algorithms to analyze the drive data to detect a brake event. For example, braking may be associated with deceleration data, and therefore, by analyzing such data, the pre-license program may determine whether a brake event has occurred. More specifically, a braking event may be detected if deceleration data indicates a threshold change in speed was exceeded (e.g., the vehicle speed decreased by at least 20 mph) and a minimum speed threshold was reached (e.g., the vehicle slowed down to 1 mph). Other algorithms may also be used to detect a brake event.

The pre-license program may also detect whether a turn event occurred at step 308. Specifically, the pre-license program may use one or more algorithms to analyze the data to detect a turn event. For example, turning may be associated with g-force data, and therefore, by analyzing such data, the pre-license program may determine whether a turn event has occurred. More specifically, a turning event may be detected if the g-force reaches a particular level (e.g., 1 g)

and maintains that level for a particular period of time (e.g., 2 seconds). Other algorithms may also be used to detect a turn event.

In response to detecting an event, such as a brake event or turn event, the pre-license program may cause the coach computing device 100c to present coaching information at step 309. Presenting the coaching information may include displaying the coaching information on a screen (or display) of the coach computing device 100c and/or outputting an audible message via the coach computing device 100c. The coaching information presented may be related to the detected event. For example, if a brake event was detected, the coaching information may include advice to the coach to tell the driver how he/she might improve breaking. Accordingly, coaching information may be presented to the coach in real-time as the user is driving, so that the coach may instruct the student in real-time.

In preparing the coaching information, the pre-license program may compare the drive data of the drive event to standards (which may change depending on an experience or level of the driver) for the drive event. For example, the pre-license program may compare drive data for a turn event with standards developed for what the drive data for a turn event should be. Based on how similar the drive data for the driver's drive event compares against the standard data for that drive event, the pre-license program may recommend praising the driver. For example, if the driver made a turn that the pre-license program determined was within some threshold of ideal drive data for a turn, the pre-license program may prepare coaching information that suggests praising the driver for his/her turn.

The coaching information presented at step 309 may also depend on the driver's skill level/experience. That is, for more advanced drivers, the coaching information may include more details. Accordingly, as the driving skills of a student progress, the coaching information may become more advanced and may focus on the finer points of driving. The pre-license program may assess the driver's skill/experience based on past drive data. In particular, the pre-license program may consider the number of minutes the student has driven, the number of drive events the student performed, and/or how well the student performed drive events. Notably, the pre-license program may determine that the student is more adept in some areas of driving than others. For example, the pre-license program may determine that a student is more advanced/experienced at brake events than turn events, and therefore, the coaching information it suggests for that student may be more detailed for brake events than turn events.

The coaching information may also be based on driving characteristics and driving conditions. For example, if it is detected that the driver is not focusing on the road, the coaching information may provide advice that the driver should look at the road. The coaching information may also include statistics, such as a percentage of accidents caused by drivers not looking at the road, so that the coach may inform the driver of the potential consequences of the driver's behavior. In another example, if it is detected that the driver is driving in the rain, the coaching information may include providing advice for how to drive in the rain, such as how to avoid hydroplaning or what to do in the event of hydroplaning.

In addition to presenting the coaching information to the coach, the pre-license program may cause the coach computing device 100c to provide audio feedback that the driver can hear. This audio feedback may be an audible message corresponding to the coaching information, in which case the coach might not have to provide the instructions. Alternatively, the audio feedback may simply provide various sounds (e.g., beeps) that the driver may recognize as being a positive or negative response to their driving performance.

Figure 4A:
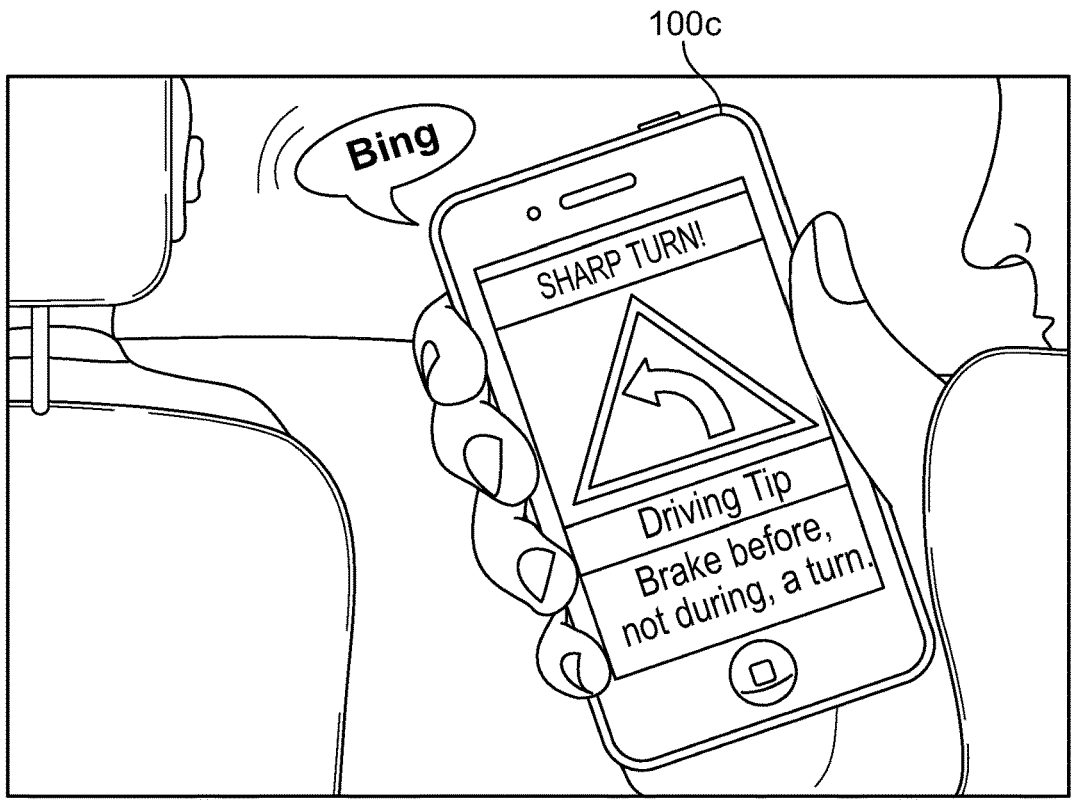
FIGS. 4A and 4B illustrate high-level diagrams of example interfaces presented by an application in accordance with aspects of the present disclosure.

FIG. 4A illustrates an example of coaching information that the pre-license program may present on the coach computing device 100c. As shown, the coaching information may include a driving tip for the coach to explain to the student. In the example of FIG. 4A, the driving tip may include the message "brake before, not during, a turn." This tip may be generated based on the drive data collected for a recently detected turn event. Here, based on the drive data, the pre-license program may have determined that the driver did not brake enough before the turn, and instead, used the brake too much in the turn. Using the results of this determination, the pre-license program may then generate the coaching information and present it to the coach as shown.

Figure 4B:
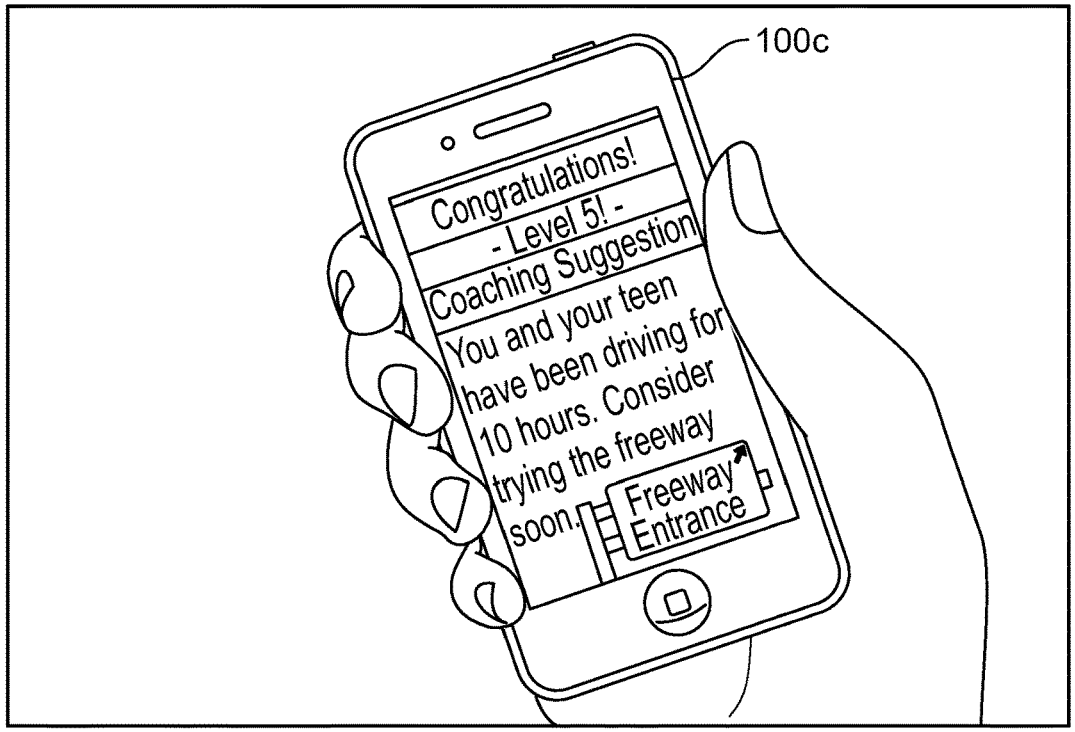

FIG. 4B illustrates another example of coaching information that the pre-license program may present on the coach computing device 100c. As shown, the coaching information may include a coaching suggestion for the coach. In the example of FIG. 4B, the driving suggestion may include the message "consider trying the freeway soon." This driving suggestion may therefore inform the coach that the student is ready to, or should attempt to, drive on a freeway. Such a driving suggestion may be generated based on the collected drive data. For example, if the collected drive data indicates that the user is braking and/or turning well at slow speeds, the driving suggestion may be to try the freeway. The pre-license program may also consider how much time the driver has spent driving in determining what suggestions to make. Moreover, the pre-license program may review past driving experiences when generating suggestions. For example, the pre-license program may check a driving history and determine that the user has not yet driven on a freeway, and then prepare the driving suggestion that the student should consider driving on the freeway. The pre-license program may also use crowdsourced data (e.g., data collected across all users or some subset of users (e.g., in a geographic area, having a same age, a same experience level, etc.) to determine what driving suggestions to generate. For example, the pre-license program may determine that most users start driving on the freeway by month 4, and thus, suggest driving on the freeway to users who have not done so by month 4.

Returning to FIG. 3, step 310 may include detecting a potential future drive event, that is, a drive event that has not yet occurred. The pre-license program may predict a future drive event using map information and position information (e.g., GPS data). In cases where the pre-license program has suggested a route or knows of a route, the pre-license program may determine that certain drive events are coming up. For example, the pre-license program may analyze a route and the location of the vehicle along that route to determine that a turn event is likely to occur soon. Or, the pre-license program may analyze the route to identify a stop sign that the vehicle is approaching, and therefore, may determine that a brake event is likely to occur soon.

When a future drive event is detected, the pre-license program may provide coaching information related to the future event to the coach computing device 100c in advance of the future drive event. That is, at step 311, the pre-license program may present coaching information for drive events that have not yet occurred, but are expected to occur. The coach may use this coaching information to provide instruction to the driver for handling the future drive event. The pre-license program may also inform the coach of a timing for providing the driver with instructions. For example, the pre-license program may determine that the vehicle is located 100 feet from a stop sign, and therefore, may recommend that the coach provide instructions to tell the driver to start slowing down at this point. The pre-license program may also factor in the speed of the vehicle when determining the ideal time that the instruction should be given. It should be understood that the coaching information could be based on a combination of previously detected drive events/patterns/behaviors and future drive events. For example, knowing that a driver's last left turn(s) was poorly performed and that a left turn is coming up, the coaching information may be specific to how the upcoming left turn could be improved.

In some embodiments, when, or after, the coach computing device 100c presents coaching information, the pre-license program may also prompt the coach for user input related to the coaching information. For example, the pre-license program may prompt the coach to provide input as to whether or not the coaching information was provided to the student or otherwise accepted. In some cases, coaches might decide not to provide the coaching information to the student, and instead remain silent or give their own instructions. In such cases, the coach may provide user inputs indicating that it rejected or did not provide the coaching information to the student. On the other hand, the coach may choose to provide the coaching information to the student and may provide an input indicating that the coaching information was given.

Moreover, when, or after, presenting the coaching information and/or prompting the coach for user input regarding whether the coaching information was given, the pre-license program may also prompt the coach for input as to whether or not the student followed the coach's advice (e.g., performed the action recommended by the coaching information). The coach may provide an input indicating whether they believe the driver followed the advice or did not follow the advice (e.g., ignored the advice or failed to follow the advice). Accordingly, the pre-license program may allow the coach to subjectively score, rate, or otherwise grade the driver's performance and/or ability to follow the coaching advice. This collected information could be used to modify what future advice is given to the coach. The pre-license program may look at the collected information across all coaches or a subset of coaches to determine which advice is more effective and/or well-received and advice may be prioritized or removed accordingly. The advice may also be crowdsourced. For example, coaches may contribute advice that they provided which was well-received or effective. The advice could then be circulated for use by other coaches and subsequent ratings could determine whether the advice is incorporated, strongly reinforced, or removed.

In step 312, the pre-license program monitors user inputs to check for user requests. At times, a coach may want to request particular coaching information whether or not the user has performed a related drive event or will perform a related drive event in the near future. That is, the coach may want to provide instructions for a particular drive event even though the pre-license program has not detected that event. Accordingly, the coach may request specific coaching information by navigating through predefined categories of coaching information and/or performing a keyword search. Based on the user's request, the pre-license program may retrieve the appropriate coaching information at step 313.

Step 314 may include determining whether the drive has ended. In some cases, the pre-license program may automatically determine that the drive has ended if the car has not moved for a predetermined period of time (e.g., 10 minutes). On the other hand, the pre-license program may rely on the user to inform it that the drive has ended. Notably, as long as the drive continues, the pre-license program may continue to perform steps 307-313. Moreover, it should be understood that these steps do not have to be performed in the order shown. For example, the pre-license program may detect a future drive event before it detects a drive event that has already occurred. Further, the pre-license program may present coaching information for multiple past drive events before presenting coaching information for a future drive event. Also, user requests for particular coaching information may be received and handled at any time during the drive. In short, the order that steps 307-313 are performed will depend on the events, characteristics, or other features of the particular drive and the user inputs during that drive.

After the drive is over, at step 315, the coach computing device 100c may exchange drive data with other computing devices, such as the student computing device 100b and vehicle computing device 100v. For example, the coach computing device 100c may share the coaching information it presented during the drive with the student computing device 100b, so that the student may view the coaching information on his/her own device. Additionally, or alternatively, the coach computing device 100c may share a recording of the coach's instructions to the driver that the coach computing device 100c recorded using its microphone. Further, the coach computing device 100c may provide a report of the inputs that the coach made during the drive. For example, the coach computing device 100c may provide a report showing which coaching information the coach accepted or provided and which coaching information the coach rejected or did not provide. Such a report may also indicate which coaching advice the coach thought the student followed and which coaching advice the coach thought the student did not follow. As such, a student computing device 100b receiving such reports may give the student the opportunity to review the coach's decisions and thoughts about the student's driving performance. In some embodiments, reports may be broken down by coach so a student may be able to review different data for different coaches (e.g., review comments made by mom and review comments made by dad). Also, the information gathered from such reports may be used to modify the coaching information provided to coaches in the future.

In step 315, the coach computing device 100c may also upload information to an administrative computing device 100a or application server 203 via the network 201. Such information may include a number of minutes spent coaching/training the student driver. This information may be compiled at the administrative computing device 100a or application server 203 so that statistics reflecting how much time coaches are spending on training student drivers can be generated. Other types of information may be uploaded as well. The coach computing device 100c may include a camera, and therefore, may be used to take photographs of the student while he/she is driving. The coach computing device 100c could also be used to take photographs of various driving events and/or experiences, such as the student's first flat tire, first time driving to the beach, etc. In some embodiments, a photograph may be captured automatically depending on driving events, accelerometer data, etc. For example, a photograph of a parent's face may be taken when a driver slams on the brakes. The pre-license program may facilitate posting or sharing these photographs on a webpage hosted by the administrative computing device 100a or application server 203.

Step 316 illustrates that the pre-license program may provide the coach with coaching history data. The pre-license program may store drive data and a log of coaching information that it presented to the coach after each drive. As the pre-license program is used for a number of drives, the pre-license program may compile the data for each drive to prepare an overview of the student's and/or coach's performance. For example, the pre-license program may prepare a report showing the coaching information that was previously provided on a drive-by-drive basis. The coach history data may also show how many minutes the coach has spent teaching the student and/or other students. Further, the coach history data may provide statistics acquired from other coaches to show the coach how much time other coaches are spending teaching their students. From such statistical information, coaches may assess themselves and determine whether they should be spending more time training their student.

Although FIG. 3 depicts step 316 as the last step, it should be understood that the coaching history data may be viewed at any time and that other steps may be performed after it. In general, FIG. 3 illustrates steps in an example order, but the steps may be implemented in various orders. Indeed, the various features and steps may be combined, divided, omitted, and/or augmented in any desired manner, depending on the specific process desired. For example, the pre-license program may present route suggestions as described with respect to steps 304 and 305 during the drive as well. Also, the user could request coaching information, as described with respect to step 312, before or after drives. The processes of the pre-license program should not be limited to the example embodiments described.

Figure 5:
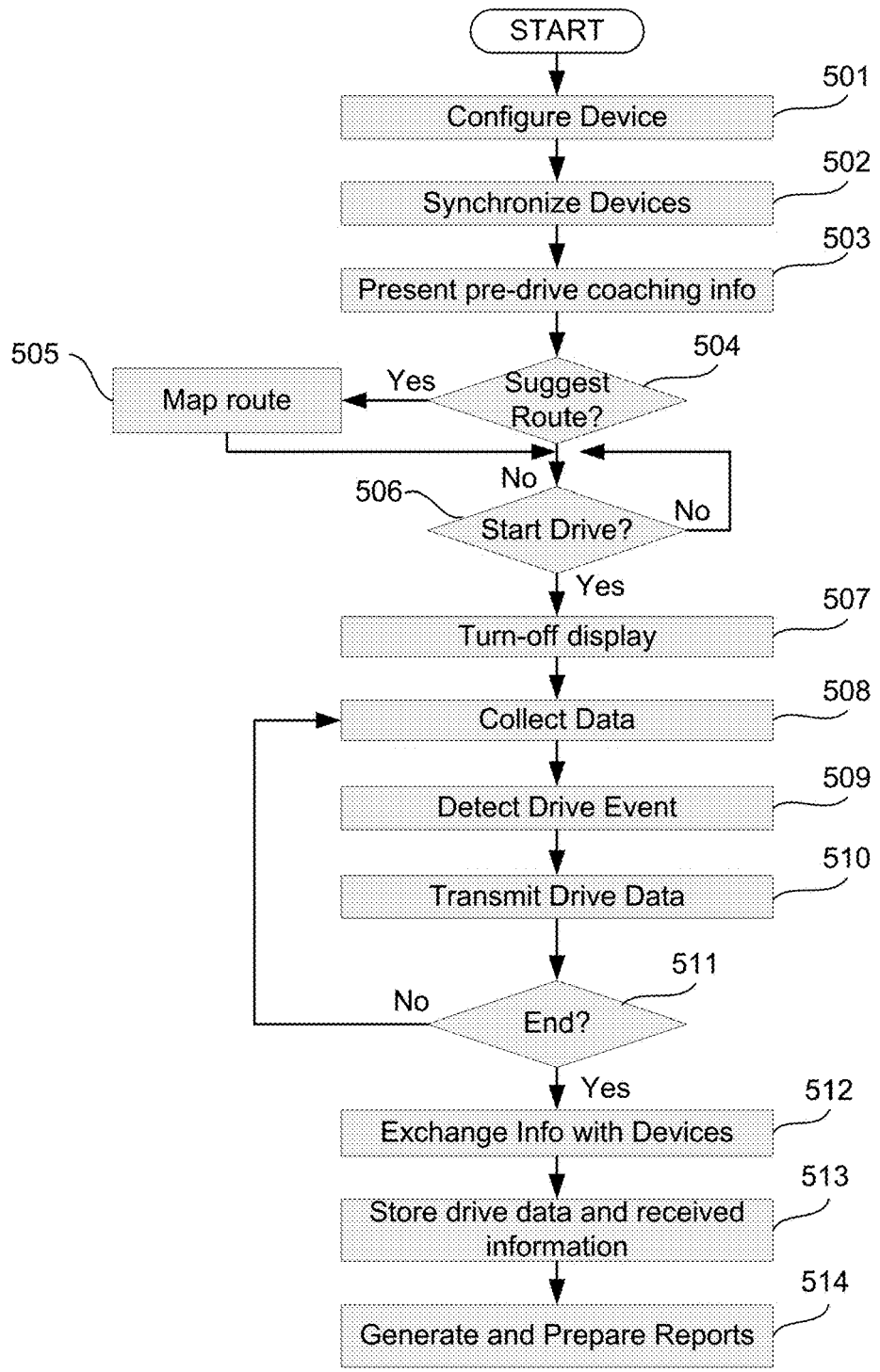
FIG. 5 illustrates a flow diagram of an example process in accordance with aspects of the present disclosure.

FIG. 5 illustrates a flow diagram for an example process in accordance with aspects of the present disclosure. More specifically, FIG. 5 illustrates a plurality of steps a student computing device 100b may perform to provide a student with feedback as they learn to drive. One or more of the steps of FIG. 5 may be performed as a result of executing the pre-license program on the student computing device 100b.

As shown in FIG. 5, the process may begin with a step of configuring the student computing device 100b in step 501. The configuration in step 501 may be performed in a similar manner to the configuration in step 301 of FIG. 3. That is, the configuration may include calibrating the student computing device 100b and registering the student with the administrative computing device 100a or an application server 203. In the registration process, students may set up a profile for themselves. They may provide their name, age, driver's permit number, state they are trying to receive a driver's license in, etc. Students may also set up profiles for coaches that they anticipate having (or have had) teach them to drive. For example, a teenager may set up a profile for each of his/her parents so that the teenager can track which parent is giving which instructions, which parent is spending more time training the teenager, etc.

Steps 502-506 may be similarly performed on the student computing device 100b in a similar manner that steps 302-306 are performed on the coach computing device 100c. However, on the student computing device 100b, when the drive is started (Yes at step 506), the student computing device 100b may turn off its display. The pre-license program may cause the student computing device 100b to turn off its display at step 507 so that the student is not distracted by the display. While the user is driving, the pre-license program might only display a screen on the student computing device 100b that allows the user to stop the drive. That is, the pre-license program executing on the student computing device 100b may determine that coaching information should not be displayed while the user is driving.

In some embodiments, the pre-license program may cause certain functions of the student computing device 100b to be inoperable while the student is driving. For example, the pre-license program may prevent incoming/outgoing phone calls and text messages (e.g., SMS messages). As a result, the pre-license program may help reduce the likelihood that the student becomes distracted by the student computing device 100b while driving.

At step 508, the pre-license program may cause the student computing device 100b to collect drive data, such as vehicle telematics data. Drive data may be collected from the student computing device 100b in a similar manner that drive data is collected from the coach computing device 100c as described above. That is, the pre-license program may collect drive data from a 3-axis accelerometer, gyroscope, GPS, etc. of the student computing device 100b. Additionally, or alternatively, the pre-license program executing on the student computing device 100b may receive the drive data from the vehicle computing device 100v and/or the coach computing device 100c. Also, at step 509, drive events may be detected based on the collected drive data. Notably, the pre-license program may collect drive data and detect drive events without notifying the student during the drive so as not to distract the student.

Although FIG. 5 does not show steps for presenting coaching information, in some embodiments, the student computing device 100b may generate and present coaching information. In particular, the student computing device 100b may present audible messages providing the coaching information so that the student does not have to rely on the coach for such coaching information.

Step 510 illustrates that the student computing device 100b may transmit drive data while the student is driving. As described above, the drive data may be collected on the student computing device 100b and transmitted to the coach computing device 100c, which may use the information to present coaching information.

At step 511, the pre-license program may determine whether the student has finished a drive. This may include determining that the vehicle has not moved for some predetermined period of time (e.g., 2 minutes) or receiving an indication from the user that the drive has ended (e.g., the user may press a key on the student computing device 100b indicating the end of the drive). After the drive, in step 512, the student computing device 100b may exchange data with other devices, such as the administrative computing device 100a, the coach computing device 100c, and/or vehicle computing device 100v. For example, the student computing device 100b may send/receive an audio recording of the sound in the car during the drive. This recording, therefore, may include the dialogue between the coach and student, including what tips the coach gave the student. The student may be able to subsequently listen to the audio recording to see what his/her coach said and to compare it against the coaching information which indicates what the coach should have said.

In step 513, the pre-license program may store the collected drive data and information received from other devices on the student computing device 100b. In some cases, this data/information may be transmitted to an administrative computing device 100a and/or application server 203 and stored in association with the student or student computing device 100b.

In step 514, the pre-license program may generate and present reports to the student. These reports may provide feedback on how the user performed during the most recent drive and how the user is progressing. This feedback may be presented with graphs, charts, and other illustrations. The feedback may also be divided into categories to assess various driving skills, such as braking, turning, etc. The reports may also include tips for improving the student's driving skills. Further, the reports may show which goals the user has accomplished and which goals remain. The pre-license program may generate and provide a checklist of useful drives that a driver should complete in preparation for a driving test. The pre-license program also may include a checklist of skills that are tested during a driving test, so the student can keep track of their preparation for the driving test. For example, if parallel parking is required on a driving test, the pre-license program may keep a record of the number of times the student has practiced parallel parking and a score associated with each attempt. The score may be generated by the coach using the coach computing device 100c and transmitted to the student computing device 100b. The pre-license program may assist the coach in scoring so that the coach gives consistent scores and progress can be tracked. In some cases, the pre-license program may generate the score itself based on entered information, such as the distance between the car and curb after parallel parking. The reports may also keep a log of mandatory pre-license driving time. For states that require a certain amount of driving time, the pre-license program can keep track of the amount of time the student has driven, so that it can be determined whether the student has met the requirements, or on track to meet the requirements, for the state he/she hopes to obtain a license in.

Figure 6A:
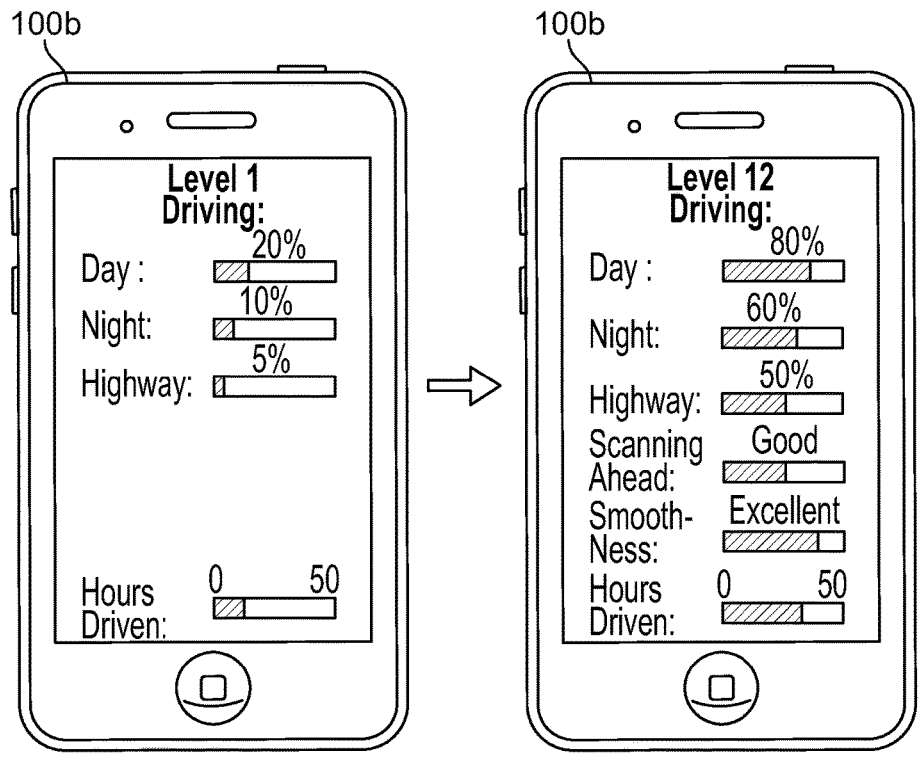
FIGS. 6A and 6B illustrate high-level diagrams of example interfaces presented by an application in accordance with aspects of the present disclosure.

FIG. 6A illustrates examples of progress reports that the pre-license program may present on the student computing device 100b at step 514. As shown, the progress reports may include bar graphs to reflect the student's driving experience/skill in a number of categories. In the examples of FIG. 6A, the categories in which the student is assessed include day driving, night driving, highway driving, scanning ahead, smoothness, total time (e.g., hours) of driving. The values for the categories may be calculated by the pre-license program based on various algorithms using various thresholds.

Some values may be directly proportional to an amount of time driving under certain conditions. For example, the value of the night driving category may be a reflection of the number of minutes a user has driven at night. Whether a student is driving during the night may be based on one or more of the following: a time of the drive, sunrise/sunset times, GPS or other location information, infrared sensor data, light sensor data, light data from a camera, etc. Information regarding whether a student is driving at night or day may be included within the drive data collected at step 508. Standards may be established setting forth the ideal/recommended amount of time a student should spend driving at night. Then, the amount of time the student has spent driving at night may be compared to these standards to receive a score or percentage as shown.

On the other hand, some values may be determined based on subjective and/or objective data collected at step 508. For example, the scanning ahead score of FIG. 6A may be based on subjective data entered by a coach via a coach computing device 100c. The pre-license program running on the student computing device 100b may receive the subjective score from the coach and incorporate it into its reports. Meanwhile, the smoothness score may be based on objective drive data collected in step 508. The pre-license program executing on the student computing device 100b may analyze acceleration and deceleration data collected through the student computing device 100b, coach computing device 100c, and/or vehicle computing device 100v. Specifically, the pre-license program may compare such acceleration and deceleration data with predefined thresholds to determine how smoothly the student is driving. Generally, constant or gradually increasing acceleration and constant or gradually decreasing deceleration may indicate smooth driving.

FIG. 6A also illustrates that the pre-license program may prescribe different levels (e.g., level 1, level 12, etc.) to students as their skills and experience progress. As a student demonstrates better driving skills and/or acquires more driving experience (e.g., in terms of driving time), the pre-license program may determine that the user has reached different levels. For example, the pre-license program may determine that the student has reached level 2 when the student exceeds a first minimum threshold in a set of categories and reached level 3 when the student exceeds a second minimum threshold, higher than the first minimum threshold, in the set of categories (which may change). By prescribing levels to the students, the pre-license program may help the user appreciate their improvements and incentivize or encourage the student to continue to work on their driving skills.

Figure 6B:
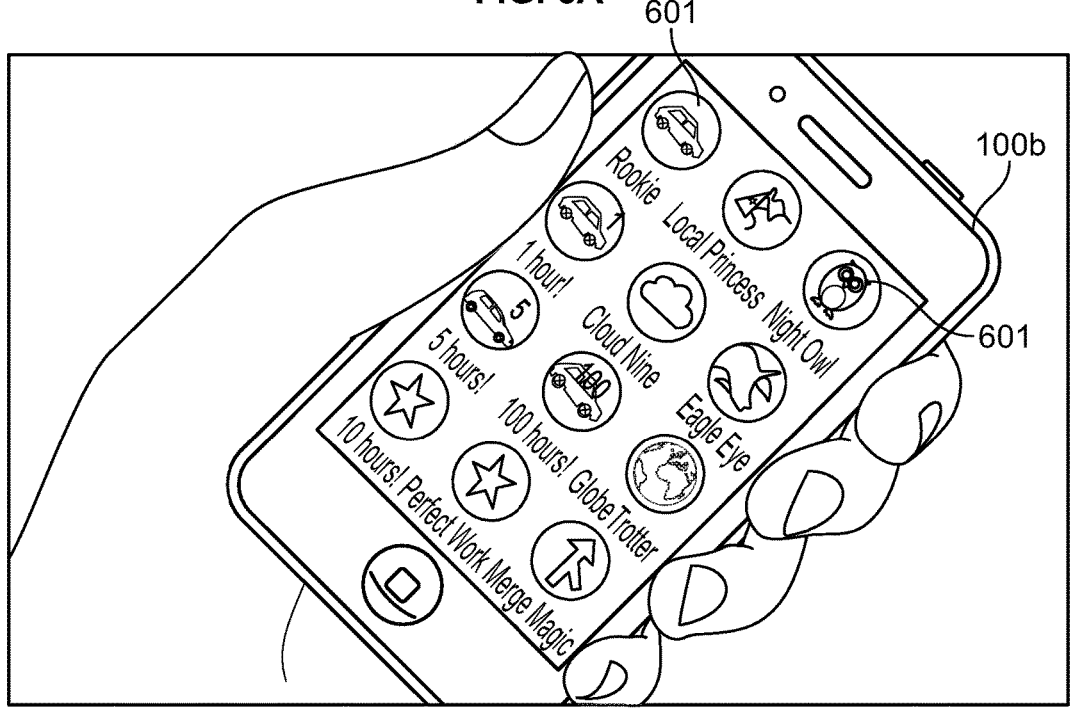

FIG. 6B illustrates examples of additional feedback that the pre-license program may present on the student computing device 100b at step 514. As shown, the pre-license program may recognize certain accomplishments achieved by the student and may reward the student with badges 601. Additionally, or alternatively, stars, points, or other rewards/recognition may be provided. Similar to prescribing levels, the pre-license program may prescribe certain badges 601 to highlight certain student achievements as they the student advances towards driving proficiency. For example, the student may receive a "Night Owl" badge if they drive a total of 3 hours in the dark. In another example, the student may receive a "Globe Trotter" badge if they drive for a certain number of miles or for a certain period of time in a single drive.

Figure 7:
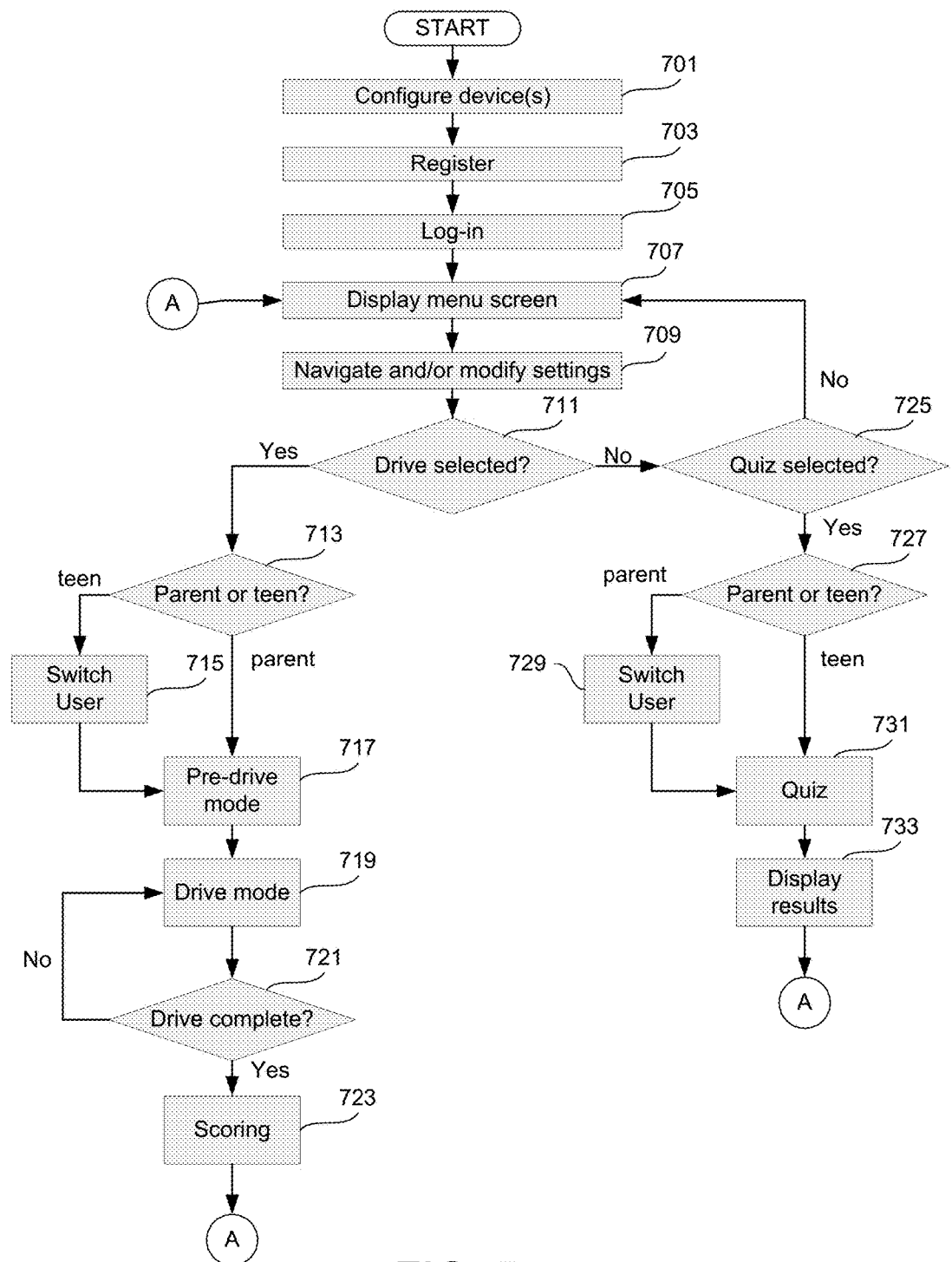
FIG. 7 illustrates a flow diagram of an example process in accordance with aspects of the present disclosure.

FIG. 7 illustrates a flow diagram for an example process in accordance with aspects of the present disclosure. More specifically, FIG. 7 illustrates a plurality of steps a computing device 100 may perform to assist a person in learning to drive and/or preparing for a driver's license examination, which may include a driving and/or written portions. The computing device 100 that performs the steps of FIG. 7 may be a student computing device 100b (e.g., a teenager's smartphone), a coach computing device 100c (e.g., a parent's smartphone), and/or a vehicle computing device 100v (e.g., a computer of a vehicle 207). One or more of the steps of FIG. 7 may be performed as a result of executing a pre-license program on the computing device 100.

As shown in FIG. 7, the process may begin with a step of configuring the computing device 100 in step 701. Configuring the computing device 100 may include obtaining (e.g., downloading) the pre-license program and installing the pre-license program on the computing device 100. As a result of configuring at step 701, the computing device 100 may provide a path (e.g., shortcut) to load the pre-license program. For example, the computing device 100 may add an icon or other graphic to a screen provided by an operating system of the computing device 100, so that a user of the computing device 100 may access the pre-license program.

In step 703, a user may register to use the pre-license program. Registration may be performed the first time the pre-license program is loaded after being installed on a particular computing device 100. Registration may include agreeing to terms and conditions of a software license to use the pre-license program. Registration may also include collecting and storing information identifying the user and/or some user settings.

The pre-license program may cause the computing device 100 to display one or more screens for performing registration. FIGS. 8A-8K illustrate example user interfaces, including registration screens, that may be provided in step 703. In some embodiments, the user interfaces of FIGS. 8A-8K may be presented in order such that FIG. 8A may be displayed first, followed by FIG. 8B, followed by FIG. 8C, and so on until FIG. 8K is displayed. In other embodiments, the order may vary. For example, the order may vary depending on the user inputs received. Also, one or more of the interfaces of FIGS. 8A-8K might not exist and/or additional interfaces may be presented.

Figure 8B:
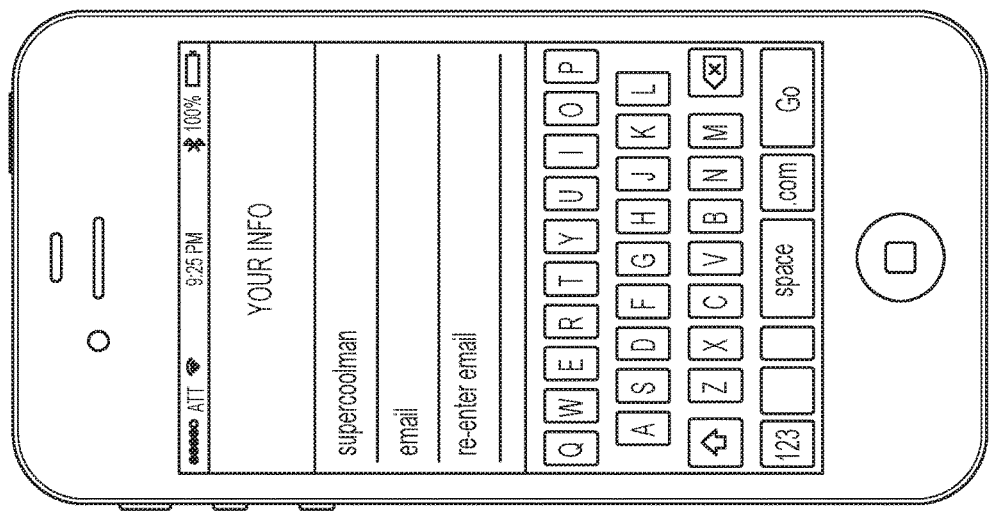
FIGS. 8A-8K illustrate example interfaces presented by an application in accordance with aspects of the present disclosure.
Figure 8A:
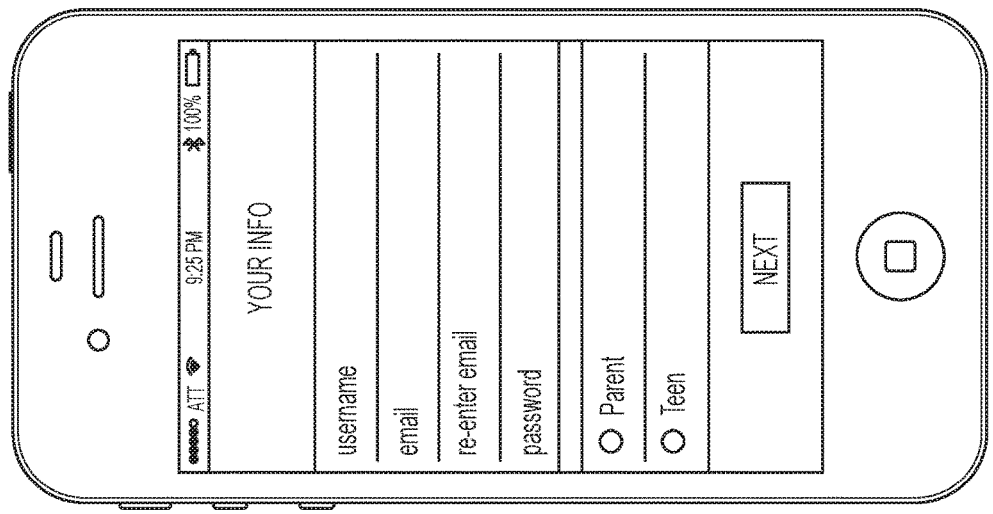
Figure 8D:
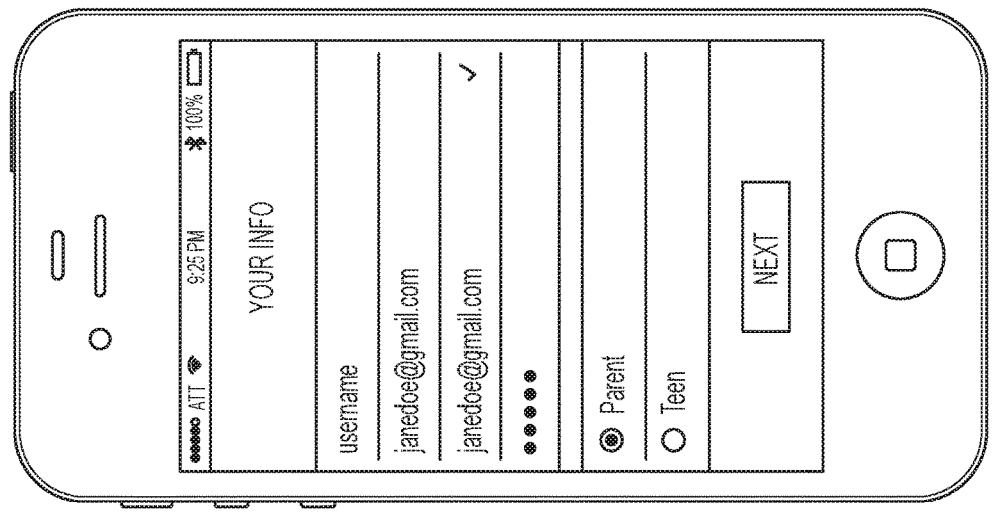
Figure 8C:
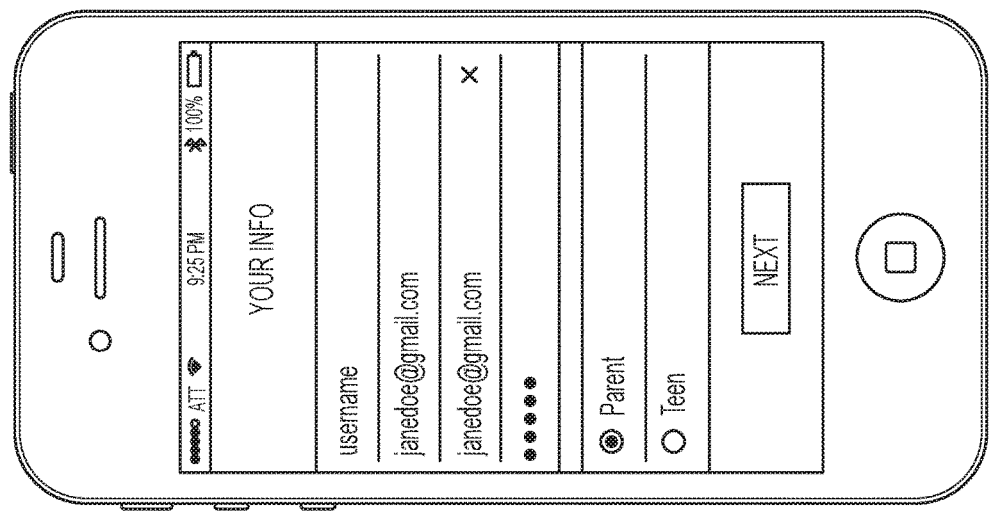

As shown in FIGS. 8A and 8B, the user interfaces may allow a user to enter user information, such as a username, email address, and/or password. Further, as shown in FIGS. 8C-8D, the user interfaces may allow a user to designate whether he or she is a coach/parent or student/teen. In some embodiments, a user may be required to provide certain information and/or identify oneself as a coach/parent or student/teen in order to complete registration. For example, as shown in FIGS. 8D and 8E, a username, password, email address, and/or parent/teen (or coach/student) designation may be required before an option (e.g., next button) to proceed with registration is activated/enabled.

Figure 8F:
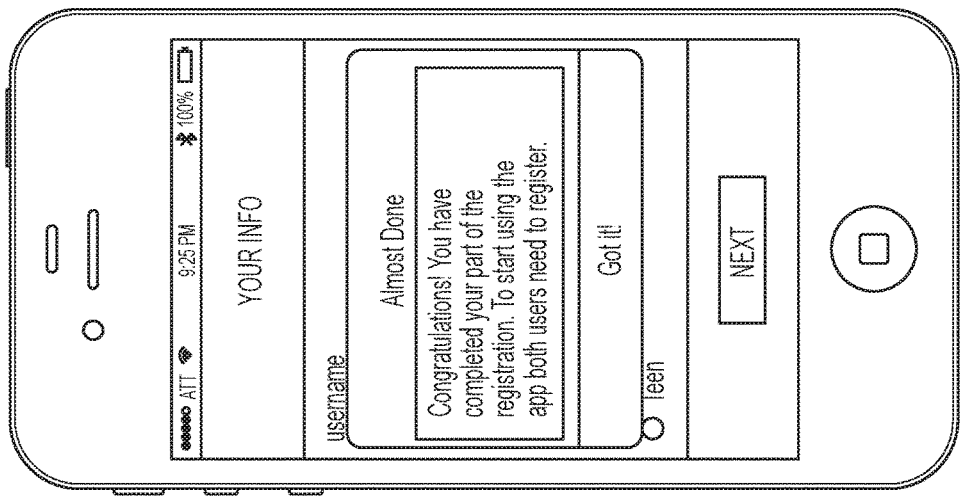
Figure 8E:
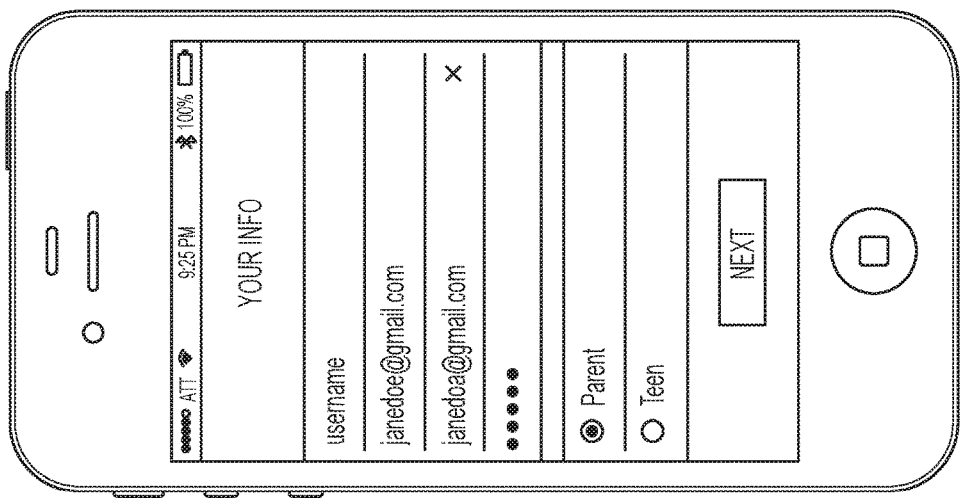

As illustrated in FIG. 8F, in some embodiments, two or more users may be required to register before certain features (any set of the features described herein) of the pre-license program may be accessed or used. For example, the pre-license program may require that a parent/coach and teen/student both register before the pre-license program provides driving tips. A parent/coach and teen/student may perform registration in sequence using the same computing device 100. Alternatively, a parent/coach and teen/student may perform registration simultaneously or asynchronously using two different devices that may synchronize upon completion of the registration process at step 703. For example, a parent/coach may use a coaching device 100c to register and a teen/student may use a student computing device 100b to register, and the coaching device 100c and student computing device 100b may exchange registration information after registration is complete. The registration information may be exchanged through a near field communication system or a wide area network, such as the Internet.

Figure 8H:
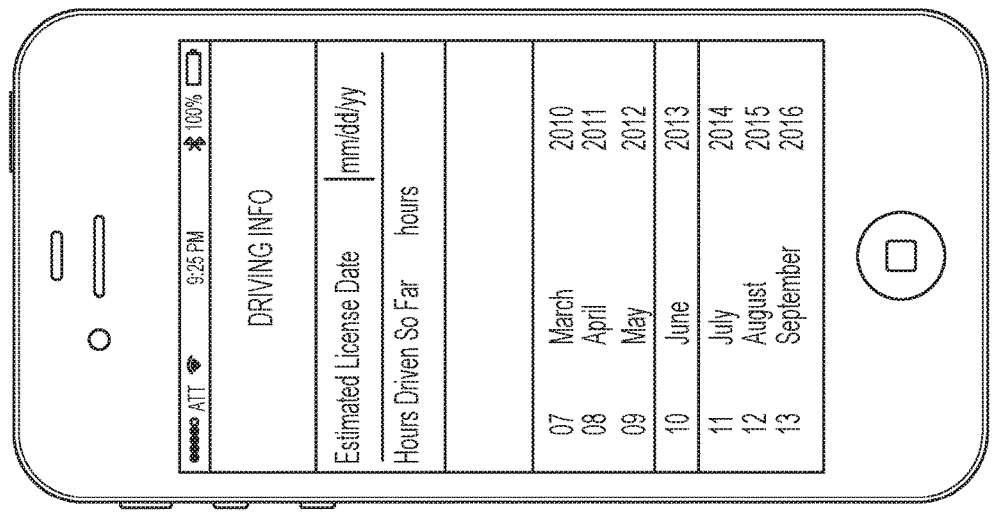
Figure 8G:
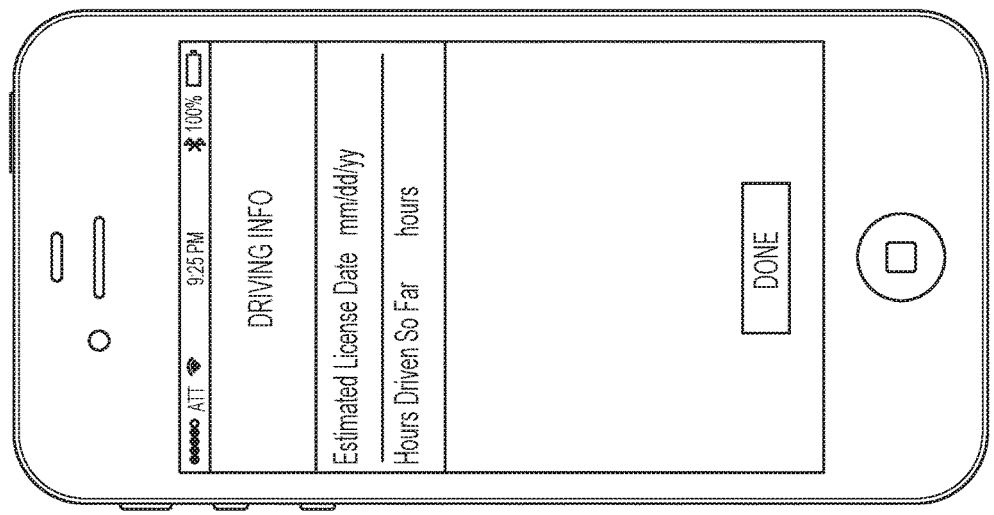
Figure 8I:
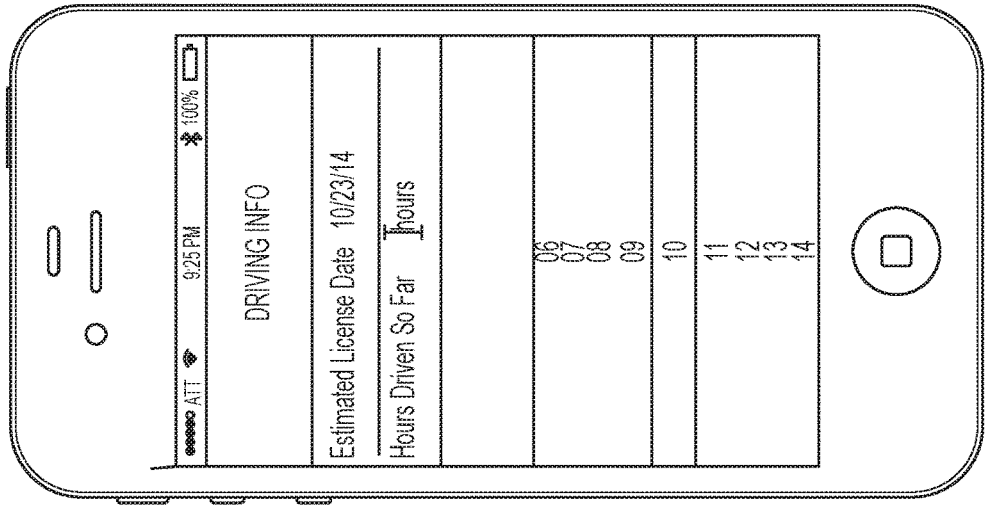
Figure 8J:
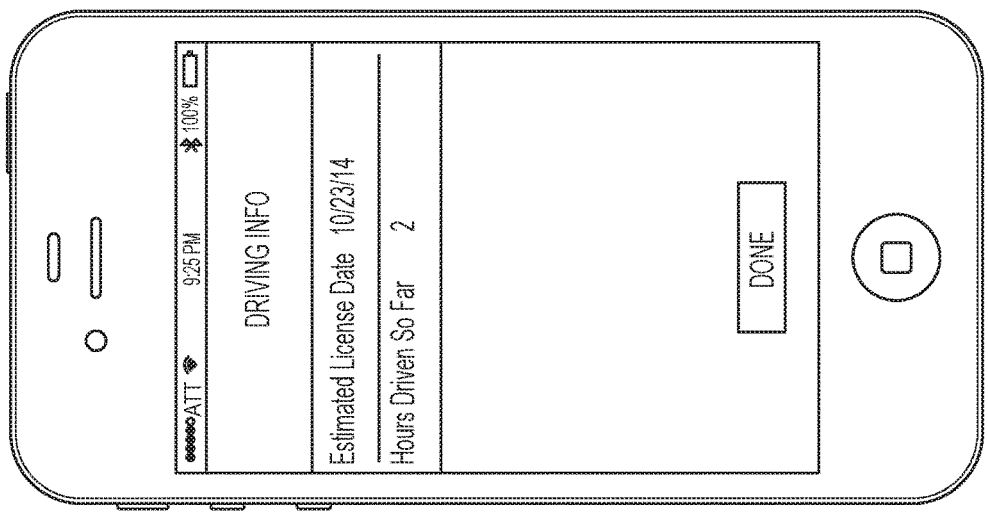
Figure 8K:
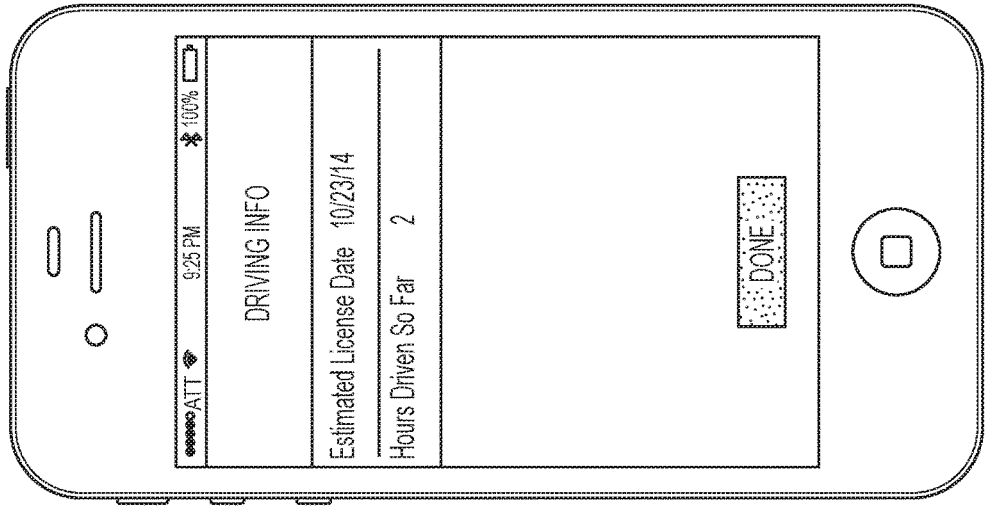

FIGS. 8G-8K illustrate further information that may be collected during registration at step 703. For example, FIG. 8H illustrates that the user (e.g., parent/coach or teen/student) may enter an estimated license date. The estimated license data may be a date that the user expects or hopes the teen/student will take her driver's test. In some examples, the estimated license date may correspond to the teen's/student's birthday as that may be the earliest time the teen/student is eligible to take the driver's test. FIG. 8H also illustrates that a user may enter an estimate of the number of hours a student/teen has driven already by the time of registration. Some teens/students may have prior driving experience, and thus, may begin at higher levels (described herein), held to a higher standard, and/or be given more advanced driving tips (described herein).

Further, different interfaces may be provided (e.g., displayed) for registering different users. For example, some registration screens may be provided to parents/coaches only. For example, the user interfaces of FIGS. 8G-8K may be provided to parents/coaches only.

When registration is complete, the pre-license program may associate a parent/coach with one or more teens/students. This association may be stored locally (e.g., on the computing device 100 executing the pre-license program) and/or remotely (e.g., on an application server 203). Also, upon completion of registration, the pre-license program may cause the computing device 100 to send information obtained during the registration process to an application server 203.

In step 705, a user may log-in to the pre-license program. Logging-in may occur automatically after registration is complete or may be performed at a later time (e.g., when a user selects the pre-license program). The pre-license program may provide a state machine for determining and controlling whether a user is logged-in or not. The pre-license program may operate in a logged-in mode (or log-in state) when the user is logged-in or a logged-out mode (or log-out state) when the user is logged-out.

Figure 9C:
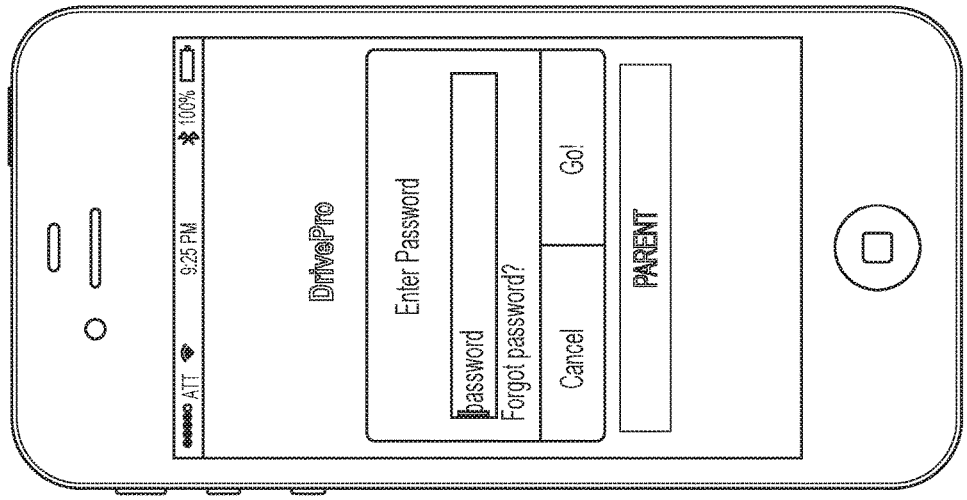
FIGS. 9A-9C illustrate example interfaces presented by an application in accordance with aspects of the present disclosure.
Figure 9B:
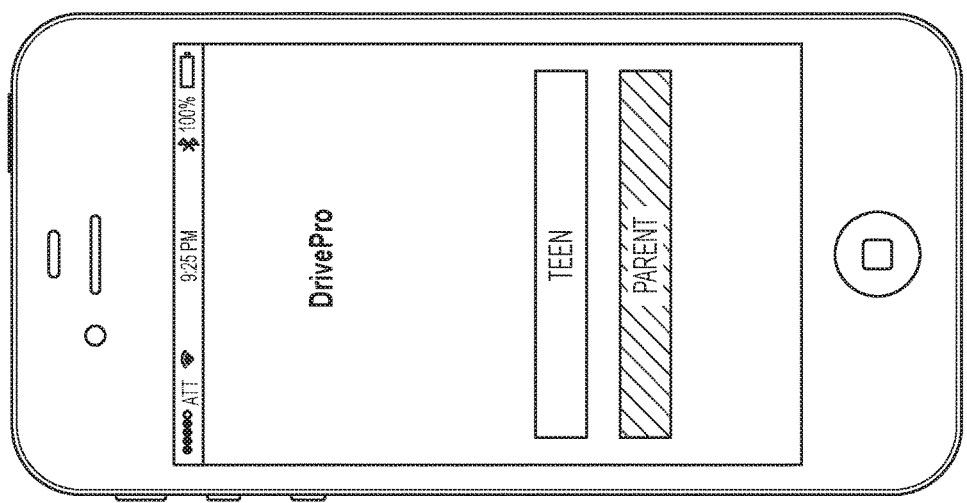
Figure 9A:
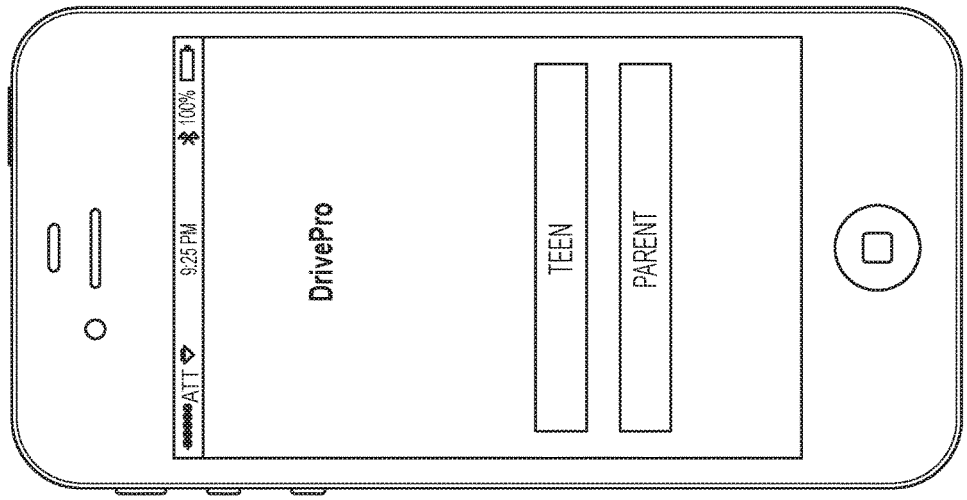

The pre-license program may cause the computing device 100 to present one or more screens that a user may access to log-in. FIGS. 9A-9C illustrate example user interfaces, including log-in screens, that may be provided in step 705. As shown in FIG. 9A, an initial log-in screen may provide two options (e.g., virtual buttons) for a user to select. For example, the user may select whether he/she is a teen/student or parent/coach. FIG. 9B illustrates an example, where the user selects an option that indicates the user is a parent or coach. FIG. 9C illustrates that a user interface may be displayed to prompt the user for a password to log-in. If a user selects the option indicating that she is a parent or coach, the user may be required to enter a corresponding password identifying the user as the parent or coach. On the other hand, if a user selects the option indicating that she is a teen or student, the user may be required to enter a corresponding password identifying the user as the teen or student. Still, in some embodiments, a password may only be required for one or the other. For example, a password may only be required for a parent or coach. As such, a teen or student may be prevented from scoring themselves or performing other actions that only a parent or coach may be permitted to perform.

Step 705 may also include confirming whether the user supplied password matches a previously acquired password. In other words, step 705 may also include authenticating a user. The pre-license program may compare a password entered through a log-in screen with a password previously entered through a registration screen to determine whether there is a match. In some embodiments, the previously entered password may be stored remotely (e.g., in an application server 203), and thus, the pre-license program may request and receive the password information as part of the comparison in step 705. Alternatively, the comparison may be performed in the cloud or in a backend system (e.g., at the application server 203) and the pre-license program may receive the results of the comparison to determine whether to authenticate the user.

In some embodiments, a single instance of the pre-license program may support multiple user profiles for multiple parents/coaches and/or multiple teens/students. For example, two parents may share a computing device 100 (e.g., tablet, smartphone, etc.) running a single instance of the pre-license program, and each parent may be able to use their own password to log-in to their own version of the program having their own settings. Accordingly, authentication performed in step 705 may include determining whether an entered password matches any one of a group of passwords. Further, step 705 may include logging-in the user based on the authenticated password so that the pre-license program is customized for the user (e.g., so that user specific settings and/or a user profile are implemented by the pre-license program).

After a user successfully logs-in at step 705, a user interface, including a menu screen, may be provided at step 707. The pre-license program may cause the computing device 100 to provide a user interface, including a menu screen, on a display coupled to the computing device 100. For example, the pre-license program may cause a smartphone to display a menu screen on a screen of the smartphone. In some embodiments, there may be more than one menu screen. The pre-license program may determine which of the multiple menu screens to display based on various factors, such as the last menu screen displayed, default settings, or user defined settings.

Figure 10:
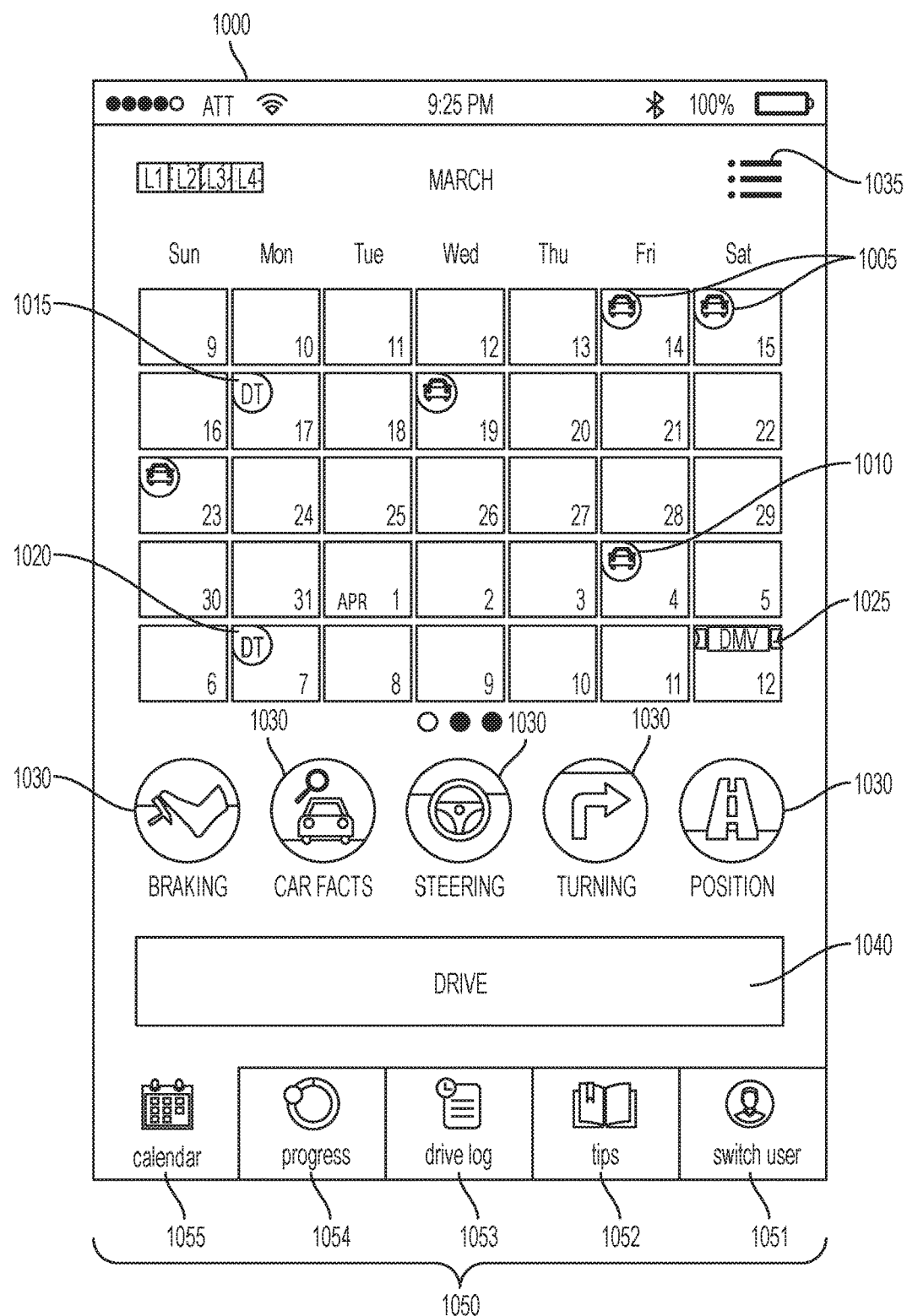
FIG. 10 illustrates an example interface presented by an application in accordance with aspects of the present disclosure.
Figure 11:
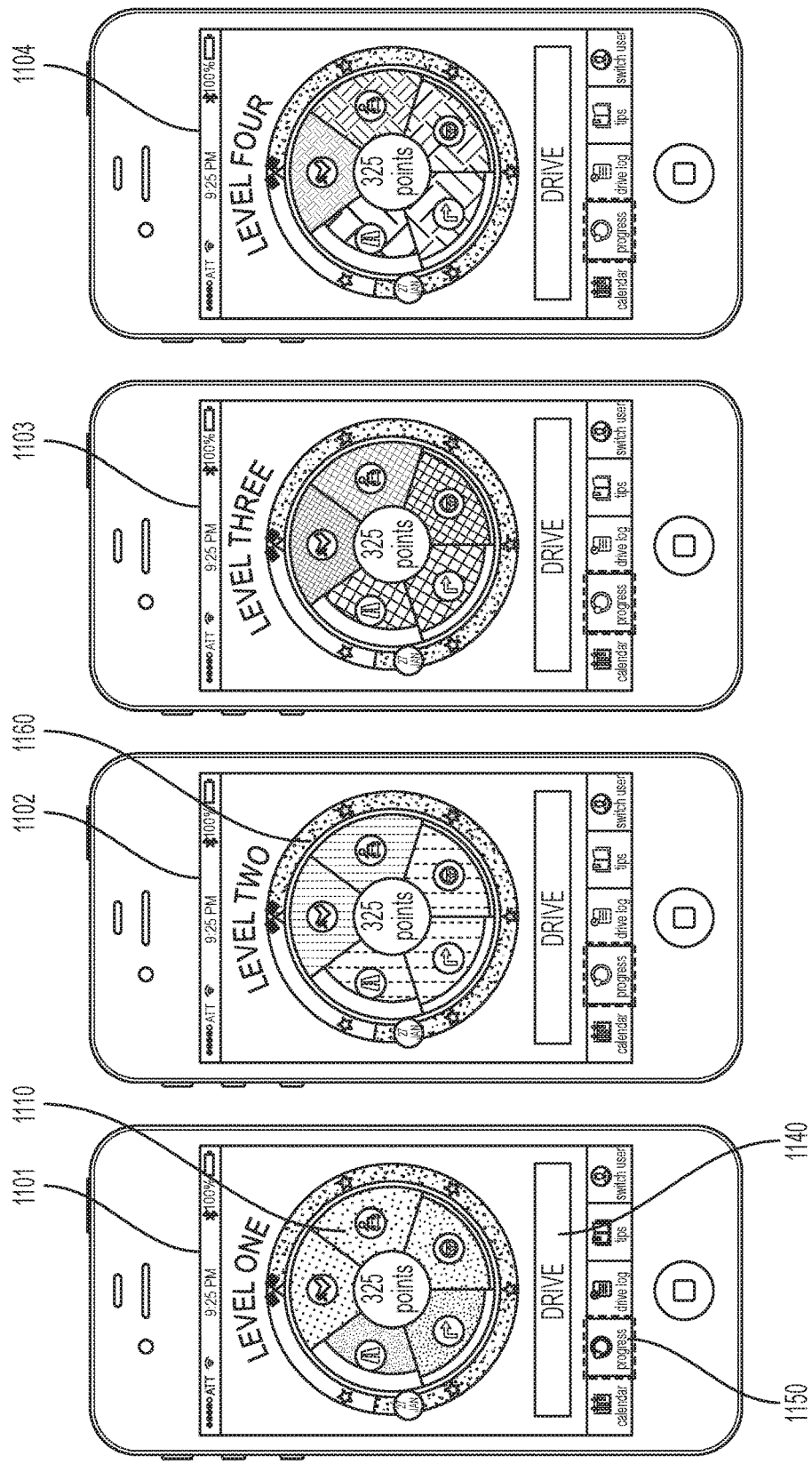
FIG. 11 illustrates example interfaces presented by an application in accordance with aspects of the present disclosure.
Figure 12:
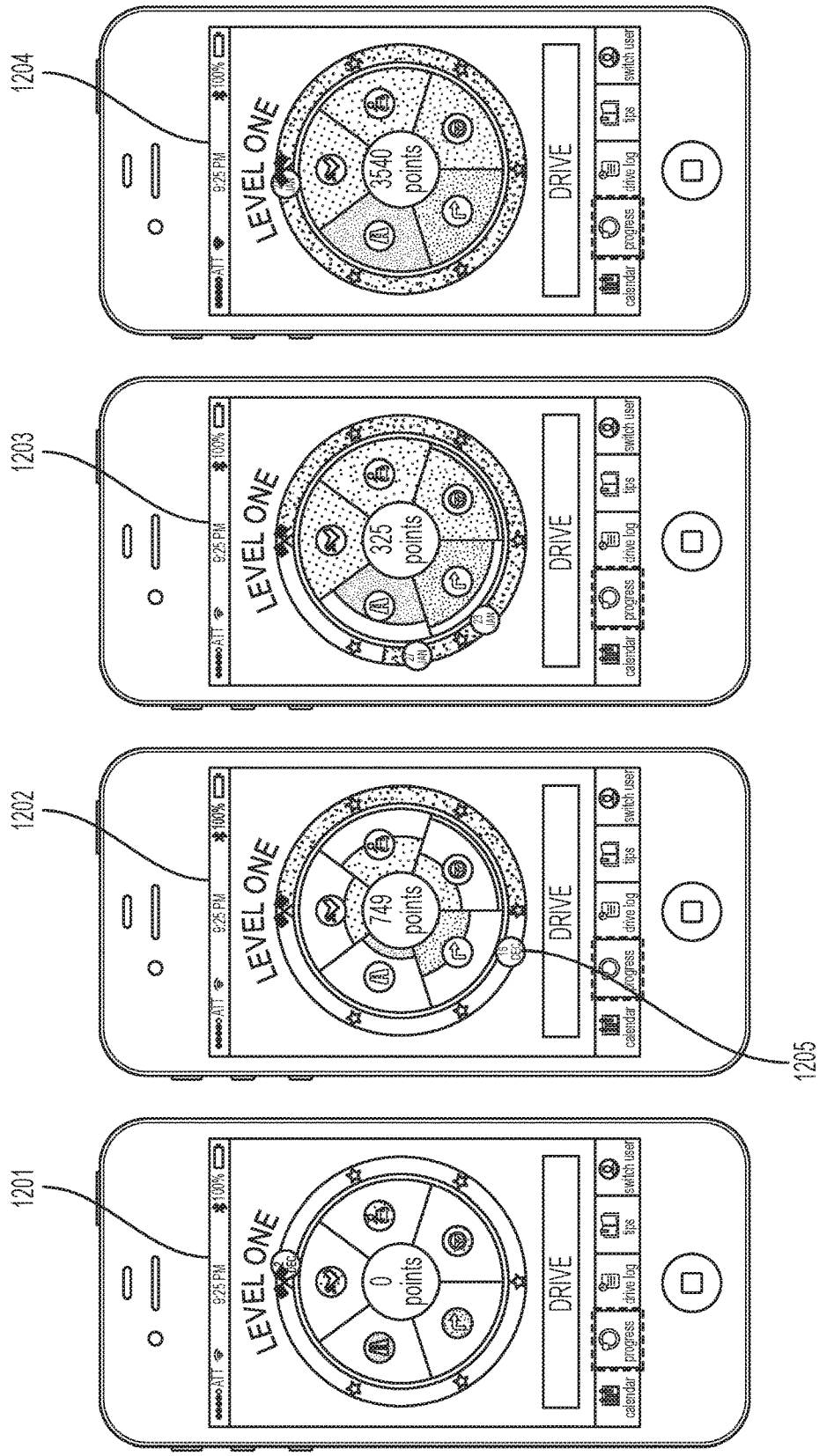
FIG. 12 illustrates example interfaces presented by an application in accordance with aspects of the present disclosure.

FIGS. 10, 11, and 12 illustrate example user interfaces, having different menu screens, that may be provided at step 707. FIG. 10 illustrates an example of a calendar screen, while FIGS. 11 and 12 illustrate a number of examples of progress circle screens.

Referring to FIG. 10, the calendar screen 1000 may include a calendar section displaying a calendar. The calendar may be displayed with a multi-week view (e.g., 5 week view) as shown in FIG. 10 or any other view, such as a daily, weekly, bi-weekly, monthly, or quarterly view. When the calendar is not in the daily view, the calendar screen 1000 may indicate the current date (e.g., present date) by highlighting or otherwise marking the current day within the calendar. For example, in FIG. 10, the pre-license program indicates that March $25^{th}$ is the current day.

The calendar may also be color coded. For example, blocks representing days in the calendar may be marked (e.g., shaded/filled) with certain colors indicating a skill level the teen/student is expected to be at on that date. For example, the blocks in the calendar may be marked with different colors depending on which of a set of levels within the pre-license program the teen/student is expected or projected to be at on that date. For example, if the teen/student is expected (or projected) to be at level one on March $20^{th}$, the block in the calendar representing March $20^{th}$ may be shaded (or filled, outlined, etc.) with the color yellow corresponding to level one. In comparison, if the teen/student is expected (or projected) to be at level two on April $10^{th}$, the block in the calendar representing April $10^{th}$ may be shaded (or filled, outlined, etc.) with the color green corresponding to level two.

Further, in some embodiments, the color of the outline or highlight indicating the current day may indicate the skill level of the teen/student at that time. For example, if the user is at a skill level corresponding to level one, the highlight around the block representing March $25^{th}$ (e.g., the current date in FIG. 10) may be a yellow color associated with level one. In comparison, for example, if the user is at a skill level corresponding to level two, the highlight around the block representing March $25^{th}$ (e.g., the current date in FIG. 10) may be a green color associated with level two. Also, the color of the highlight or outline around the block representing the current date may be different from the color that the block of the current date is shaded with to indicate the teen's (or student's) progress. For example, if the block for March $25^{th}$ is shaded with the color yellow indicating that the teen should be (or expected to be) at level one on that date, but the block for March $25^{th}$ is highlighted with the color green indicating that the teen is at level two on that date, then the user may be able to determine that the teen is ahead of schedule in developing her driving skills. As such, users of the pre-license program may, by viewing the calendar screen 1000, readily appreciate how the teen/student is progressing in relation to the expected or projected track.

Various algorithms may be used to determine the expected or projected track. Examples of factors that may be used in the algorithm include demographic information of the teen/student, geographical information of the teen/student (e.g., which state the teen/student lives in—different states may be deemed harder to obtain a license in because, e.g., they may test different skills), a date on which a user (e.g., teen/student and/or parent/coach) performed registration (e.g., registration of step 703), a date the user estimates will be the date the teen/student takes a driving test to obtain a driver's license (e.g., "estimated license date" entered in FIGS. 8G and 8H), a number of hours the teen/student has already driven (e.g., "hours driven so far" entered in FIG. 8J), a data on which the teen/student received a driver's permit, a birthday of the teen/student, and/or a driving history of a parent/coach (e.g., some parents/coaches may be better teachers and therefore may be expected to advance their teens/students faster). For example, the pre-license program may retrieve the estimated license date (e.g., a targeted or scheduled driver's license test date) entered by the user, e.g., during registration. The pre-license program may then calculate the total amount of days from the current date (the date on which the calculation is performed or the date on which the estimated license date is retrieved) to the estimated license date. Alternatively, the pre-license program may determine a total number of days from the day a teen received her permit to the day she is scheduled to take a driving test and breakdown this total number of days into levels.

Next the pre-license program may break down the total days into a number of groups of days corresponding to a number of levels. If there are four levels within the pre-license program, the pre-license program may break down (or divide) the total number of days into four groups, where each group is assigned to a level. In some embodiments, the groups may have an equal number of days. Alternatively, the total number of days may be broken down by assigning a percentage of the total days to each level. For example, level one may be assigned the first 13% of the total days, level two may be assigned the next 20% of the total days, level three may be assigned the next 31% of the total days, and level four may be assigned the last 36% of the total days. Accordingly, if there are 100 total days before the student/teen is scheduled to take his/her driver's license test, the pre-license program may, for example, assign days 1-13 to the first level and color the corresponding dates in the calendar yellow, assign days 14-33 to the second level and color the corresponding dates in the calendar green, assign days 34-64 to the third level and color the corresponding dates in the calendar blue, and assign days 65-100 to the fourth level and color the corresponding dates in the calendar purple.

Any percentages may be used in the algorithm assigning days to levels. In some embodiments, if it is desired that the user be given more time to practice at the first level than in other levels, then the percentage of the total days assigned to the first level may be greater than the percentages of days assigned to other levels. If calculating percentages of the total number of days results in fractions of days, the pre-license program may round to the nearest whole number as long as rounding does not result in assigning a date after the estimated license date.

Moreover, different embodiments may implement a different number of levels. Levels may be used to track the progress of students/teens as they improve their driving skills. Each level may be associated with a set of driving skills to be tested in that level. As the students/teens improve their driving they may move up to a next level. In some embodiments, a student/teen may have to complete each skill (e.g., reach a goal skill level) in the set of skills at one level to move up to the next level. Also, in some embodiments, when setting up the projected track, the program may take into consideration a number of hours the teen has already driven and determine whether the teen is on track. The program may discount some of the hours to avoid over-estimations and/or cap the number of hours a teen is able to jump ahead through the levels.

Still referring to FIG. 10, the calendar screen 1000 may also include icons to depict when the user has gone on a drive and when the user is planning to (or scheduled to or recommended to) go on a drive. As shown in FIG. 10, a past drive icon 1005 may be included in the calendar on each date that the student/teen performed a drive. FIG. 10 also shows a future drive icon 1010 that may appear on a date in the calendar on which the student/teen is planning to, scheduled to, or recommended to go on a drive. FIG. 10 shows the past drive icons 1005 and future drive icon 1010 (which is a gray version of the past drive icon 1005) as having a tear drop shape with a car graphic in the middle; however, any other shapes, text, and/or graphics may be used for these icons.

The calendar screen 1000 of FIG. 10 may also include icons to depict when the user is has participated in a driving training session and when the user is planning to (or scheduled to or recommended to) participate in a driving training session. A driving training session may include a drive where the student/teen is accompanied by a professional and/or certified driving coach. In some states, students/teens may be required to complete a certain number of driving training sessions with certified driving instructors. In FIG. 10, a past driving training icon 1015 may be included in the calendar on each date that the student/teen participated in (or completed) a driving training session. FIG. 10 also shows a future driving training icon 1020 that may appear on a date in the calendar on which the student/teen is planning to, scheduled to, or recommended to participate in a driving training session with a certified or professional driving instructor. FIG. 10 shows the past driving training icon(s) 1015 and future driving training icon(s) 1020 (which is a gray version of the past driving training icon 1015) as having a tear drop shape with a "DT" in the middle; however, any other shapes, text, and/or graphics may be used for these icons.

Further, the calendar screen may depict a target test date icon 1025 identifying the date on which the user (e.g., teen/student) is scheduled to or planning to take a driver's license test. In various states, the driver's license test may include a written portion, a driving portion, or both. The target test date icon 1025 may identify the date on which the user is scheduled to or planning to take either portion or both. Alternatively, different icons may be used to identify the written portion and the driving portion. FIG. 10 illustrates that the target test date icon 1025 may be a banner with text reciting "DMV;" however, any other shapes, text, and/or graphics may be used for this icon.

Additionally, FIG. 10 illustrates that the calendar screen 1000 may include one or more test skill icons 1030. For example, the calendar screen 1000 may display test skill icons 1030 of selected test skills In FIG. 10, five selected test skills are shown by way of example. The five selected test skills may be assigned to a particular level. In some embodiments, a user may be able to assign the selected test skills to a particular level and swap selected test skills as described further herein. Also, in some embodiments, as a user scrolls through the calendar, the pre-license program may update the calendar screen 1000 to display the corresponding selected test skills for the level being shown. For example, if the user scrolls down through the calendar from a date assigned to level one to a date assigned to level two, the calendar screen 1000 may be updated to reflect the different selected test skills of level two.

The graphics or images used for the test skill icons 1030 in FIG. 10 are examples, and other graphics or images may be used. Also, although the test skill icons 1030 in FIG. 10 are shown as circles, other shapes may be used. Moreover, the test skill icons 1030 may be shaded by different amounts as illustrated in FIG. 10. The different amounts of shading may indicate the progress or skill level of the student/teen with respect to the corresponding test skill. For example, if the test skill icon 1030 for braking is shaded halfway, this may symbolize that the teen/student is halfway to reaching a target skill level with respect to braking a vehicle. With respect to the braking skill, a target skill level may be in terms of a number of times a teen/student should bring a vehicle to a complete stop. For example, the pre-license program may set a total number of full stops to 100 so that the teen/student must complete 100 full stops to reach the target level for braking and completely fill the test skill icon 1030 for braking. In such a case, if the teen/student has only completed 50 of the 100 full stops needed to fill the test skill icon 1030 for braking, the calendar screen 1000 may show the test skill icon 1030 for braking as being halfway filled (or colored or shaded).

Alternatively, or additionally, the target skill level for the braking skill may be in terms of an amount of time (e.g., number of minutes) a student/teen has driven. The pre-license program may assume, for example, that a driver needs to drive for a certain amount of time before they likely become skilled at braking. For example, the pre-license program may set the target skill level for braking to be 10 hours so that the teen/student must complete 10 hours of driving to reach the target level for braking and completely fill the test skill icon 1030 for braking. In such a case, if the teen/student has only completed 3 hours of the 10 hours needed to fill the test skill icon 1030 for braking, the calendar screen 1000 may show the test skill icon 1030 for braking as being 30% filled (or colored or shaded). The target skill levels for different skills may be determined in different terms. For example, a total number of stops may be used for the braking skill level, while a total driving time may be used for a steering skill level. Also, in some embodiments, all skills may be judged in the same terms (e.g., based on total driving time), but different target skill levels may be set. For example, 8 hours of total driving may be set as the target skill level for a turning skill, whereas 15 hours of total driving may be set as the target skill level for a braking skill. The difference in target skill levels may correspond (e.g., may be proportional) to the amount each skill is expected to be practiced while driving. For example, the pre-license program may expect that a teen/student will be practicing turning more often than she practices braking within the course of any given trip, and as such, may set the target skill level higher for braking. Moreover, target scores to be inputted by a parent/coach and/or determined by the pre-license program (e.g., from accelerometer data, GPS data, etc.) may be used to set the target skill levels.

FIG. 10 also illustrates that the calendar screen 1000 may include a settings option 1035. A user may select the settings option 1035 to change settings of the pre-license program, such as the target license date (in the event that the user reschedules the driver's license test), when (e.g., when behind schedule by a week) and how (email, phone call, push notification, etc.) a user is notified of events, and usernames and/or passwords. The user may also use the settings option 1035 to access other screens to perform various other functions of the pre-license program, such as swapping selected test skills to test at different levels or changing their password.

Further, FIG. 10 illustrates that the calendar screen 1000 may include a start drive option 1040. Selection of the start drive option may initiate a driving mode of the pre-license program. The start drive option 1040 may be selected when a teen/student is about to begin a drive or after the teen/student has started driving (e.g., shortly after the student/teen starts driving).

The calendar screen 1000 may also include a tab bar (or toolbar) 1050 with tab bar options 1051-1055, as shown in FIG. 10. The tab bar options 1051-1055 may be selected by a user thereby allowing a user to manually access various screens provided by the pre-license program. Selection of the tab bar option 1051 may cause the pre-license program to display a switch user screen so that the user of the computing device 100 may switch from being a parent/coach to a teen/student or vice versa. Switching users may be performed because different features might be accessible to parents/coaches than those accessible to teens/students.

Selection of the tab bar option 1052 may cause the pre-license program to display a tips screen so that, for example, a coach or parent may access driving tips to give their students or teens. In some embodiments, students/teens may also access a tips screen to review driving tips. That is, in some embodiments, the tab bar option 1052 may be activated when a user is logged-in as a teen/student as well as when a user is logged-in as a parent/coach.

Selection of the tab bar option 1053 may cause the pre-license program to display a drive log screen so that a user may view information related to past drives. Such information may include dates when students/teens performed drives and scores or points received for those drives. The drive log screen may also include information indicating how long each drive was, what time the drive started, how many points were earned, a total amount of time (e.g., hours) a student has driven, an average number of drives per week, an average drive time (e.g., mins per drive), and what level the teen/student was at during the drive.

Selection of the tab bar option 1054 may cause the pre-license program to display a progress circle screen, like the progress circle screens in FIGS. 11 and 12. A progress circle screen may be an example of a menu screen displayed at step 707.

Referring to FIG. 11, the progress circle screen may vary depending on the level a student/teen is at. FIG. 11 illustrates four progress circle screens 1101, 1102, 1103, and 1104 for four different levels, respectively. The progress circle screens 1101-1104 may include a pie chart 1110. The pie chart 1110 may include one or more pie slices. In some embodiments, the number of pie slices may correspond to the number of skills tested at the level of the progress circle screen. For example, if five skills are tested at level one, the number of pie slices in the pie chart 1110 may be five.

Also, progress circle screens 1101-1104 may indicate the number of points the user has earned. As shown in FIG. 11, an indication of the number of points may be at the center of the pie chart 1110. If the user logged-on to the pre-license program is a student/teen, the progress circle screens 1101-1104 may indicate the number of points the student/teen has earned (or been awarded). Alternatively, if the user logged-on to the pre-license program is a parent/coach, the progress circle screens 1101-1104 may indicate the number of points the parent/coach has earned (or been awarded). Accordingly, students and coaches may receive their own points. In some embodiments, the progress circle screens 1101-1104 may indicate combined points for a student-coach pair or may indicate separate point values for both on a single screen. In some embodiments, the number of points a coach/parent has earned may correspond to a total number of points earned by their students/teens.

In addition, the progress circle screens 1101-1104 may include a start drive option 1140 similar to the start drive option 1040 of the calendar screen 1000. The progress circle screens 1101-1104 may also include a tab bar 1150 similar to the tab bar 1050 of the calendar screen 1000.

Further, the progress circle screens 1101-1104 may include an outer circle graph 1160. As shown in FIG. 11, the outer circle graph 1160 may circle the pie chart 1110. The outer circle graph 1160 may indicate a progress of the student/teen towards obtaining target skill levels for certain skills FIG. 12 illustrates various features of the outer circle graph 1160.

Referring to FIG. 12, the outer circle graph 1160 may be filled as the teen/student progresses towards obtaining a target overall skill level. In some embodiments, the outer circle graph 1160 may be filled in a clockwise direction starting at 12 o'clock. The progress circle screen 1201 illustrates an example of the outer circle graph 1160 where the teen/student has not made any progress. The progress circle screen 1202 illustrates an example of the outer circle graph 1160 where the teen/student has reached a halfway point toward the target overall skill level. The progress circle screen 1203 illustrates an example of the outer circle graph 1160 where the teen/student's progress is over 75% of the target overall skill level. Finally, the progress circle screen 1204 illustrates an example of the outer circle graph 1160 where the teen/student has reached the target overall skill level. Various algorithms may be used to determine the target overall skill level. The target overall skill level may be different for different teens/students. Further, various algorithms may be used to determine the overall skill level of a teen/student at any given time. For example, the pre-license program may determine that a teen/student has reached 50% of the target overall skill level if the teen/student has reached 50% of the target skill level for each of the selected skills (or each of the skills available to be selected). Alternatively, the pre-license program may determine that a teen/student has reached 50% of the target overall skill level if the teen/student averages 50% of the target skill level across all of the selected skills (or all skills available to be selected).

FIG. 12 further illustrates that each of the pie slices of the pie chart 1110 may be filled as the teen/student progresses towards obtaining a corresponding target skill level. For example, as a teen/student progresses towards obtaining a target skill level for braking, the pie slice for the braking skill may be filled from the center of the pie chart 1110 outward. Meanwhile, as a teen/student progresses towards obtaining a target skill level for turning, the pie slice for the turning skill may be filled from the center of the pie chart 1110 outward. The progress circle screen 1201 illustrates an example of where the pie slices are not filled, such as when the teen/student has just registered or not begun to drive. The progress circle screen 1202 illustrates an example where a portion of the pie slices are filled. As illustrated in the progress circle screen 1202, each pie slice may be filled by a different amount. The amount that each pie slice is filled may correspond to a progress towards obtaining the target skill level for that skill. The progress circle screen 1203 illustrates an example where some pie slices have been completely filled while others have not been completely filled. Finally, the progress circle screen 1204 illustrates an example where all pie slices have been completely filled. Various algorithms may be used to determine the target skill levels for each skill. The target skill level may be different for different teens/students and/or for different skills. For example, a target skill level for braking may be different than a target skill level for turning. Also, a target skill level for braking for a teen/student living in an urban area may be different than a target skill level for braking for a teen/student living in a rural area. Further, various algorithms may be used to determine the skill level of a teen/student at any given time. In some embodiments, the algorithms for determining how much pie slices are filled may be similar or the same as the algorithms used to determine how much the test skill icons 1030 of FIG. 10 are filled.

Still referring to FIG. 12, the progress circle screens 1201-1204 may include a current date icon 1205. The current date icon 1205 may indicate the current date (e.g., month, day, and/or year) at a time when its progress circle screen is being displayed. For example, if the progress circle screen 1202 is being displayed on Dec. 16, 2013, the current date icon 1205 may indicate "December 16." As shown in FIG. 12, the current date icon 1205 may appear on the outer circle graph 1160. If the current date icon 1205 is ahead of the filled portion of the outer circle graph 1160, the student/teen may be behind schedule in terms of becoming prepared to take a driver's license test. In comparison, if the current date icon 1205 is behind a leading edge of the filled portion of the outer circle graph 1160, the student/teen may be ahead of schedule in terms of becoming prepared to take a driver's license test. As such, the current date icon 1205 may serve as an indication of whether the teen/student is on track to reach a target overall skill level by the time the driver's license test date is reached.

In some embodiments, the current date icon 1205 may be moved (e.g., dragged) by a user. A user may pull the current date icon 1205 back in time along the circle to a past date (which may be displayed) to see individual skill breakdowns on that past date and/or an overall score on that past date. Further, in some embodiments, a user may move the current date icon 1205 forward in time along the circle to a future date (which may be displayed) to see target scores or target skill levels.

Returning to FIG. 7, after a menu screen is displayed in step 707, a user may navigate the pre-license program and/or change settings of the pre-license program at step 709. In step 709, the pre-license program may monitor (e.g., using listeners) inputs to the computing device 100 to determine whether the user is navigating through the pre-license program or changing any settings of the pre-license program.

At step 709, a parent/coach may select which student/teen is to be evaluated (e.g., which student/teen is going to be driving) from among a plurality of students/teens of the parent/coach. Similarly, a student/teen may designate which parent/coach is going to be participating in a drive or look up information (e.g., scores or reviews) of a particular parent/coach.

At step 709, the user may navigate to a swap skills screen to swap the skills to be tested at a particular level. The number of skills tested at any one level may vary. For example, one student/teen may be tested on four skills at level one, while another student/teen may be tested on five skills at level one. Also, the number of skills tested may vary from level to level. For example, a teen/student may be tested on three skills in level one and tested on four skills in level two. The number of skills tested may increase as the levels increase. Further, the number of skills tested at each level may be the same, but the type of skills may be different. For example, if there are four levels, there may be four different sets of skills tested.

Figure 13:
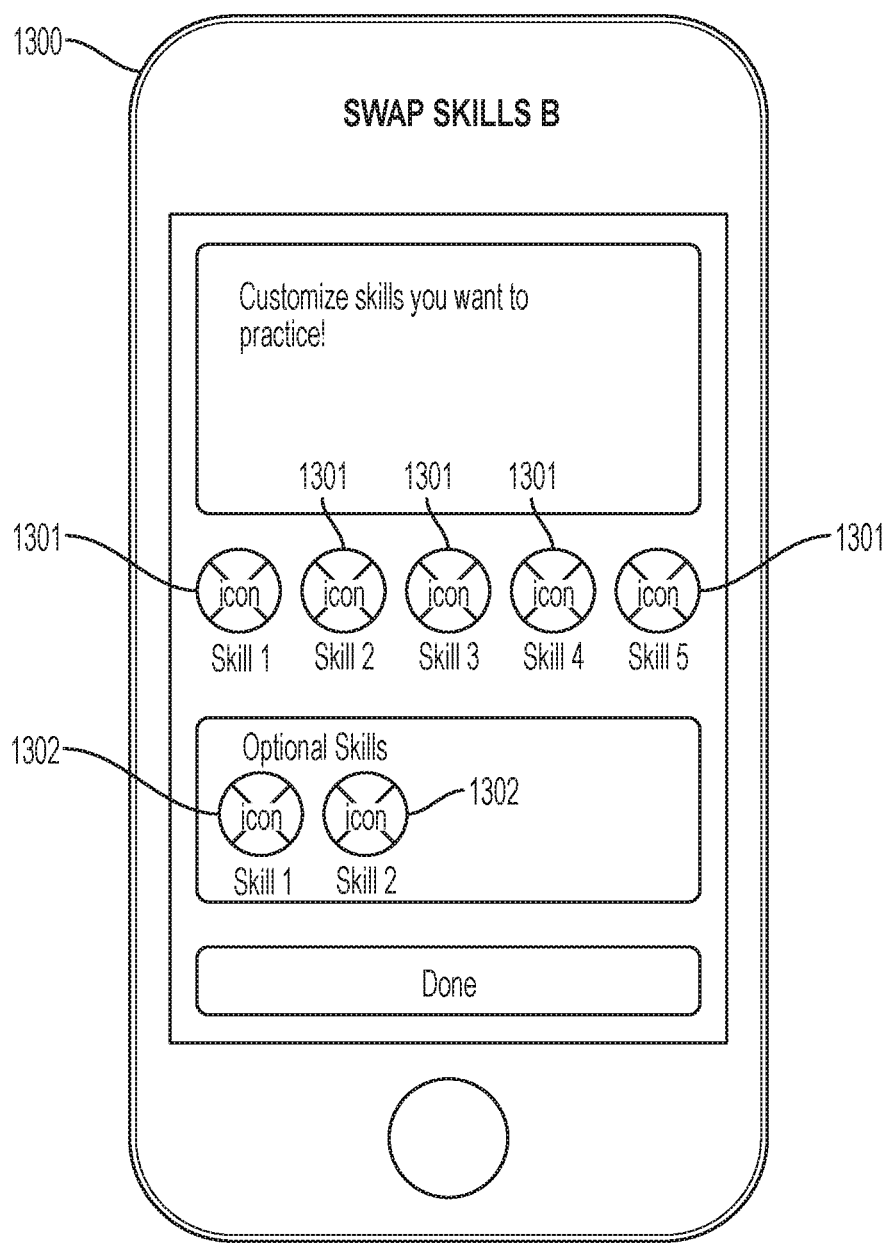
FIG. 13 illustrates an example interface presented by an application in accordance with aspects of the present disclosure.

FIG. 13 illustrates an example of a swap skills screen 1300. A user may determine which skills are tested at each of the different levels by swapping skills on the swap skills screen 1300. In some embodiments, the pre-license program may have default skills assigned to certain levels. A user may change which test skills are assigned to which levels by swapping the default skills with optional skills In some embodiments, the pre-license program may have restrictions on which skills may be swapped. For example, the pre-license program may require that certain skills be assigned to certain levels. The pre-license program may, therefore, prevent a user from swapping certain skills. For example, in level one there may be five default skills: braking, car facts, steering, turning, and position. Level one may also include two optional skills: acceleration and backing. In level one, the braking skill may be locked, and therefore, might not be swapped with an optional skill.

As illustrated in FIG. 13, the swap skills screen 1300 may include default test skill icons 1301 and optional test skill icons 1302. A user may select any of the skill icons on the swap skills screen 1300 by touching or pressing and/or holding the skill icons with a finger or other stylus. The swap skills screen 1300 may also include a description of the skill to be tested corresponding to the selected skill icon. A user may change which skills are selected for testing at a particular level by selecting a default test skill icon 1301 and optional test skill icon 1302 to swap. For example, a user may press (or click) a default test skill icon 1301 and drag it to a part of the swap skills screen 1300 where optional test skill icons 1302 are displayed. Then, a user may press (or click) an optional test skill icon 1302 and drag it to a part of the swap skills screen 1300 where the selected test skill icons are displayed. Alternatively, when you drag the test skill icon 1301 over an optional skill icon 1302, the two skills icons may be swapped. Or, when you drag the test skill icon 1301 to where the optional test skill icons 1302 are displayed, the program may automatically move the first or top-most optional test skill icon to where the test skill icons 1301 are displayed. In some embodiments, a different swap skills screen 1300 may be used for each of the different levels so that a user may set the skills to be tested for each level. Also, in some embodiments, swapping is not necessary and optional test skill icons 1302 may be added as test skill icons 1301.

Returning to FIG. 7, the pre-license program may cause the computing device 100 to detect whether a user has selected to begin a drive at step 711. In some embodiments, the pre-license program may control the computing device 100 to detect when a user presses a button, such as the start drive option 1040 of FIG. 10. The pre-license program may continuously monitor inputs to detect when a user selects to begin a drive. A user (e.g., parent/coach) may select to begin a drive at a time when (or around a time when), for example, the parent/coach and teen/student get in a vehicle 207 to go on a drive in which the teen/student is the driver.

If the pre-license program determines that the user is not going on a drive (e.g., determines that a drive option has not been selected), the process of FIG. 7 may proceed to step 725. However, if the pre-license program determines that the user is going on a drive (e.g., determines that a drive option has been selected), the process may proceed to step 713. At step 713, the pre-license program may determine whether the user of the computing device 100 is a parent/coach or teen/student. The pre-license program may determine whether the user of the computing device 100 is a parent/coach or teen/student based on who is logged-in on the pre-license program.

If the teen/student is determined to be the user at step 713, the pre-license program may request a switch in users at step 715. For example, the pre-license program may cause the computing device 100 to prompt the user to switch users so that the user is a parent/coach instead of a teen/student. For example, the pre-license program may prompt the user to log-in as a parent/coach. For example, the pre-license program may prompt the user to enter a username and/or password of a registered parent/coach.

If the switch is performed at step 715 or a parent/coach was determined to be the user at step 713, the pre-license program may enter a pre-drive mode at step 717. In step 717, the pre-license program may provide the parent/coach with advice or tip information. The advice or tip information may include suggestions for the coach/parent to provide to the driver (e.g., the student/teen) before, during, or after the drive. The advice or tip information may also include suggestions of things for the parent/coach to do during the drive. For example, the advice or tip information may include a suggestion to talk calmly when giving negative feedback and to compliment the student/teen when they do well. The advice or tip information may also include things for the parent/coach to consider in evaluating the driving of the teen/student. For example, the advice or tip information may instruct the parent/coach to look at how the teen/student holds a steering wheel of the vehicle 207, to look at where the teen/student looks at a stop sign, to look at how much distance the teen/student maintains from vehicles 207 ahead, to look at when the teen/student uses turn signals, etc.

One or more tips may be displayed during the pre-drive mode. The parent/coach may control whether they would like to see more tips or receive more advice. In some embodiments, the parent/coach may search a catalog of tip information to look for specific advice related to a specific topic. For example, if the parent/coach believes the teen/student is having difficulty turning, the parent/coach may search for advice related to turning, such as suggestions on how the driver should move his/her hands in a turn. In some embodiments, the catalog of tip information may be organized by topics corresponding to the skills tested. For example, the tip information may be organized into categories, such as braking, turning, positioning, etc., that correspond to the skills that may be tested so that the parent/coach (or teen/student) may readily find information related to skills they may need improvement on.

In some embodiments, the pre-license program may move from the pre-drive mode to a drive mode automatically after a certain period of time elapses from when the pre-drive mode began. In other embodiments, the pre-license program may remain in the pre-drive mode until the user (e.g., parent/coach) selects an option to enter the drive mode or exit the pre-drive mode (e.g., cancel a drive). For example, the pre-license program may enter the drive mode at step 719 when the parent/coach selects a start button on a screen of the computing device 100 in the pre-drive mode. Still, in some embodiments, the pre-license program may use accelerometer data and/or GPS data of the computing device 100, or received by the computing device 100, to detect that the vehicle 207 is moving, and therefore, to enter the drive mode at step 719.

When the pre-license program enters the drive mode at step 719, the pre-license program may start a timer (e.g., a timer module which may be implemented using hardware and/or software) to begin timing a drive. In some embodiments, when in the drive mode, the pre-license program may cause the presentation of a screen with the duration of the drive (e.g., how long the drive has thus far lasted). The pre-license program may also indicate the skills to be tested (e.g., display the test skill icons 1030) during the drive. In addition, the parent/coach may have access to tip information during the drive mode. In some embodiments, the parent/coach may select one of the test skill icons 1030 displayed during the drive mode to access tip information related to that skill.

In some embodiments, the pre-license program may evaluate drive data (e.g., accelerometer data, GPS data, vehicle sensor data, etc.) indicative of the driver's driving behavior/performance. Moreover, the pre-license program may provide tip information or advice during the drive mode based on the evaluation. For example, the pre-license program may determine that the driver is not braking smoothly based on data from an accelerometer of the computing device 100 executing the pre-license program, and therefore, the pre-license program may display a tip to the coach/parent so the coach/parent may give helpful advice to the student/teen to improve their braking. In some embodiments, in the drive mode, the pre-license program may issue certain driving challenges. For example, the pre-license program may issue a driving challenge to make all turns well, call out the location of nearby vehicles, or call out any time a vehicle or other object is in a blind spot of the driver's vehicle. As drivers improve their skills, additional challenges may be unlocked.

In step 721, the pre-license program may determine whether the drive is complete. The pre-license program may determine that the drive is complete when a finish or stop option (e.g., button) is selected on a screen displayed during the drive mode. As such, a user (e.g., parent/coach) may trigger the pre-license program to determine that the drive is complete. In some embodiments, the pre-license program may continuously monitor user inputs to determine whether a finish or stop button is selected. Alternatively, the pre-license program may determine that the drive is complete automatically based on drive data collected by the computing device 100. When the pre-license program determines that the drive is complete, it may stop the timer so as to obtain a duration of the drive.

Further, in some instances, there may be a required minimum duration of the drive that must be reached for the drive to be complete. Accordingly, at step 721, the pre-license program may determine whether the drive duration (e.g., obtained from a time of a timer when a finish button is selected) exceeds a minimum duration. If, for example, the pre-license program determines that the drive was too short, the pre-license program may not count the drive. As such, the pre-license program might not award the driver (e.g., student/teen) with points and/or increase the skill levels of the driver (e.g., fill the pie chart 1110).

The pre-license program may remain in the drive mode until the drive is complete. If the pre-license program determines that the drive is complete at step 721, the process may proceed to step 723. In step 723, the pre-license program may score the teen/student on their driving during the recent drive. The pre-license program may display one or more scoring screens that allow a user (e.g., parent/coach) to score the different skills selected for testing. For example, if five skills are selected for testing, the parent/coach may score each of the five skills at step 723. Each of the skills tested may be associated with a number of total points that can be obtained for the respective skill. For example, a braking skill may be associated with a total of 360 points. The student/teen may receive a portion of the total number of points based on his/her score and/or a duration of the drive.

Figure 14:
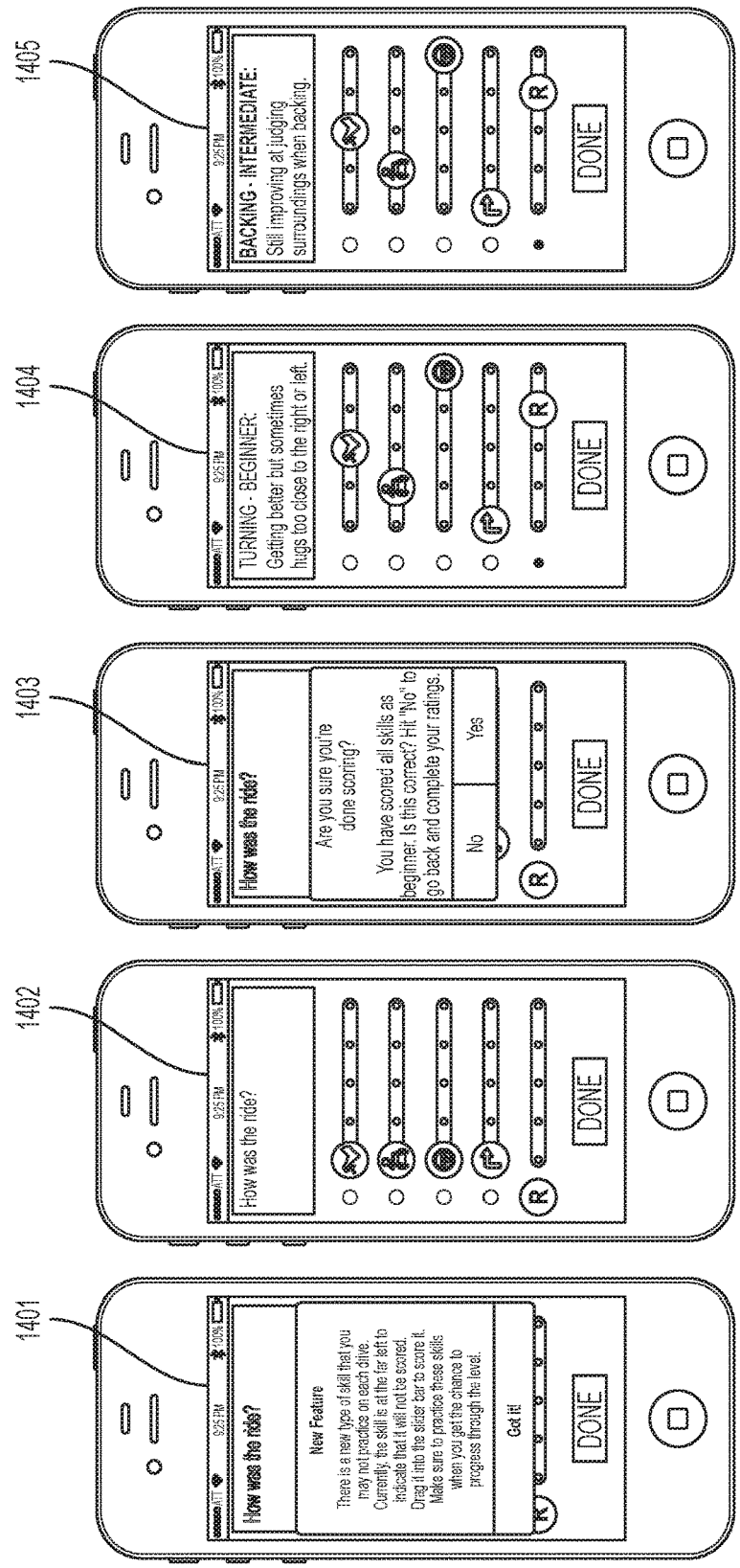
FIG. 14 illustrates example interfaces presented by an application in accordance with aspects of the present disclosure.

FIG. 14 illustrates five different scoring screens 1401-1405 that may be displayed at step 723. The scoring screens 1401-1405 illustrate various features that may be performed by the pre-license program at step 723. The first scoring screen 1401 illustrates that the scoring screens may provide instructions to the user (e.g., parent/coach) on how to score the various test skills. The second scoring screen 1402 illustrates that the pre-license program may provide questions to ask the user. The second scoring screen 1402 also illustrates that the pre-license program may provide one or more slider bars for scoring the various test skills. For example, the pre-license program may provide a slider bar for each skill to be tested during the recent drive. A user (e.g., coach/parent) may slide one or more of the test skill icons 1030 along their respective slider bars to provide scores for the various test skills. The third scoring screen 1403 illustrates that the pre-license program may prompt the user to confirm that the user is done scoring so that the user does not accidently enter incorrect scores. The fourth scoring screen 1404 and fifth scoring screen 1405 illustrate that the pre-license program may provide guidance on how the user (e.g., parent/coach) should score the driver on the various test skills.

In step 723, the pre-license program may also determine how many points the driver earned during the recent drive. Further, the pre-license program may adjust values associated with the test skills so that the pie chart 1110 and outer circle graph 1160 may be updated. Moreover, the pre-license program may store the scores in association with the drive for which they were awarded so that a user of the computing device may look back at the scores (e.g., by reviewing a drive log) at a later time. As illustrated in FIG. 7, after scoring is complete, the process may return to step 707 to display one of the menu screens.

Returning to step 711, if the pre-license program determines that the user is not going on a drive (e.g., determines that a drive option has not been selected), step 725 may be performed. In step 725, the pre-license program may determine whether the user has selected to take a quiz. The pre-license program may monitor inputs of the computing device 100 to detect when a user selects to take a quiz. In addition to helping prepare the student/teen to track the progress of their driving behavior, the pre-license program may help to educate the teen/student about recommended driving behaviors and driving laws. To facilitate this education component, the pre-license program may provide one or more quizzes. Quizzes may include one or more questions for the teen/student to answer.

If the user selects to perform a quiz (yes at step 725), the pre-license program may perform step 727. In step 727, the pre-license program may determine whether the user is a coach/parent or student/teen. Step 727 may be performed in a similar manner as step 713 described above. For example, the pre-license program may perform step 727 by using a similar module as that used to perform step 713.

In some embodiments, the quiz may be intended for testing the student/teen only, and not the coach/parent. Accordingly, if the user is determined to be a parent at step 727, the pre-license program may prompt the user to switch users at step 729. Step 729 may be performed in a similar manner as step 715 described above. For example, the pre-license program may perform step 729 by using a similar module as that used to perform step 715.

If the switch is performed at step 729 or a student/teen was determined to be the user at step 727, the pre-license program may provide a quiz to the student/teen at step 731. In step 731, the pre-license program may provide one or more questions of a quiz. Different quizzes with different questions may be provided for different levels. To complete a level, a student/teen may have to take a quiz. The difficulty of the questions for each level may increase as the student/teen progresses to subsequent levels. The questions may be in various formats and include various types of questions, such as true or false type questions, multiple choice type questions, etc. The quiz may also be timed. For example, a user may have 60 seconds to answer as many quiz questions as they can.

In step 733, the results of the quiz may be displayed. The results may indicate how many of the questions the student/teen got right. The results may include the correct answers so the student/teen may learn. At step 733, the pre-license program may also determine a score and/or how many points have been earned based on the results. Various algorithms may be used to determine the score and/or points awarded. In some embodiments, all questions may be given equal weight. In other embodiments, different questions may be given different weights. For example, questions deemed to be more difficult (e.g., past results from quizzes taken by others may indicate the degree of difficulty of some questions) may be count more toward the score and/or points awarded.

Further, step 733 may include displaying an indication of how the student/teen faired in comparison to other students/teens. For example, the results may include an indication that the student/teen answered more questions correctly than 90% of the people who answered the questions. In some embodiments, the pre-license program may include a social networking component that allows students/teens to share the results of the quiz as well as other information indicating the student/teen's progress in any of the tested skills on a social networking site. For example, the pre-license program may post the results of the quiz and/or information indicating that a particular user (e.g., teen/student) is at a particular level and/or at a particular point towards obtaining a target overall skill level on a social networking site, like FACEBOOK, or another website.

As illustrated in FIG. 7, after results are displayed at step 733, the process may return to step 707 to display one of the menu screens. In some cases, the results might not be displayed in step 733, and the process may proceed to step 707 after the quiz is completed or ended in step 731. In such cases, the results may be displayed on the menu screen displayed.

The screens described herein may be generated by the pre-license program itself (e.g., without any external assistance) or may be generated by exchanging information with an application server 203. In the latter case, the pre-license program may, for example, cause the computing device 100 executing it to send the application server 203 a signal indicating that the progress circle screen has been requested, and in response, the application server 203 may send a return signal including information to aid the pre-license program to display the progress circle screen. This return signal may include the pixel data for rendering the appropriate progress circle screen or data indicating, e.g., what level the driver is at so that the pre-license program may generate the appropriate progress circle screen.

Also, it should be understood that the screens disclosed herein are illustrative and that the pre-license program may provide different and/or additional screens. The pre-license program may also provide additional features. For example, the pre-license program may generate a push notification or other message (e.g., email) to notify the user (e.g., coach/parent or student/teen) when the student/teen falls a certain amount behind schedule. For example, the pre-license program may run in the background of a computing device 100 to determine when the student/teen falls a week behind schedule, and in response to the determination, the pre-license program may generate an email or push notification to notify a user of the computing device 100.

Another additional feature of the pre-license program may include establishing and scoring competitions. For example, the pre-license program may hold a competition among one or more students to allow students to test their driving skills against other students. The winner(s) of the competition may be determined based on an algorithm that considers one or more factors (e.g., average score, first to get a predetermined score, etc.). A student may be matched against another student to compete on a specific drive (or drives) or over a period of time (e.g., day, week, month, etc.). Students may also compete with respect to taking the quizzes or performing the driving challenges described herein. The pre-license program may perform a search to find potential competitors. Such a search may be based on various criteria (e.g., time of a drive, driver age, geographic area of driver, etc.). For example, two students may be matched up because they are both about to go on a drive in a similar geographic region. The pre-license program may notify the participants of the competition of the winner and any rewards (virtual or real). In some embodiments, the competition may be between groups or teams of students. The pre-license program may assign students to teams or allow students to select their team. In some embodiments, a student may be on more than one team. Further, in some embodiments, competitions may also be among coaches. In such embodiments, coaches may be judged based on the performance of their students and/or on the coaching advice they give.

Yet another additional feature of the pre-license program may be that it allows a parent/coach to add an alert to remind them of items on future drives. For example, a parent/coach may set an alert to remind them to tell a teen/student to slow down at an upcoming intersection (which may be determined from GPS data) because it is difficult to see around the corner.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A non-transitory computer readable storage medium storing computer-executable instructions that, when executed, cause a computing device, comprising an accelerometer, gyroscope, or global positioning system receiver, to:
   receive a target driver's license test date associated with a driver;
   determine, based on the target driver's license test date, a total number of days to prepare for a driver's license test;
   communicate with one or more additional computing devices to establish a communicative connection and a reference time;
   activate the accelerometer, gyroscope, or global positioning system receiver to detect first drive data while the driver is driving a vehicle;
   receive, through the communicative connection and from the one or more additional computing devices, second drive data;
   correlate, based on the reference time, the first drive data and the second drive data to produce final drive data;
   analyze the final drive data to determine a skill level of the driver; and
   indicate that the driver is on track to reach a target skill level by the target driver's license test date by:
      displaying a circle graph that is shaded in a clockwise direction according to the skill level of the driver; and
      displaying a marker over a shaded portion of the circle graph, wherein the marker indicates an expected skill level on a current date.

2. The non-transitory computer readable storage medium of claim 1, wherein the computer-executable instructions, when executed, further cause the computing device to:
   prompt a user for the target driver's license test date during a registration of the computer-executable instructions.

3. The non-transitory computer readable storage medium of claim 1, wherein the computer-executable instructions, when executed, further cause the computing device to:
   divide the total number of days into a plurality of groups, wherein each of the plurality of groups is associated with a level.

4. The non-transitory computer readable storage medium of claim 3, wherein the total number of days is divided according to an algorithm that sets forth percentages of the total number of days to be assigned to the plurality of groups, respectively.

5. The non-transitory computer readable storage medium of claim 4,
   wherein at least two of the percentages are different, and
   wherein the total number of days corresponds to a number of days between a date on which the driver receives a driver's permit and the target driver's license test date.

6. The non-transitory computer readable storage medium of claim 1, wherein indicating that the driver is not on track to reach the target skill level by the target driver's license test date comprises displaying a calendar using one color to indicate a projected skill level associated with a present date and another color to indicate an actual skill level associated with the present date.

7. The non-transitory computer readable storage medium of claim 1, wherein the computer-executable instructions, when executed, further cause the computing device to indicate that the driver is not on track to reach the target skill level by the target driver's license test date by:
   displaying the circle graph; and
   displaying a second marker on the circle graph showing a projected skill level at a present date.

8. The non-transitory computer readable storage medium of claim 1, wherein the computer-executable instructions, when executed, further cause the computing device to:
   determine skill levels of the driver for a plurality of test skills, respectively; and
   display the skill levels of the driver by shading areas associated with the plurality of test skills, respectively.

9. The non-transitory computer readable storage medium of claim 8, wherein the computer-executable instructions, when executed, further cause the computing device to:
   present a screen that allows a user to change the plurality of test skills.

10. The non-transitory computer readable storage medium of claim 1, wherein the computer-executable instructions, when executed, further cause the computing device to:
    provide tip information to a user of the computing device in response to a selection indicating the driver is starting a drive.

11. The non-transitory computer readable storage medium of claim 10, wherein the computer-executable instructions, when executed, further cause the computing device to:
    determine a weakest skill of the driver among a set of skills to be tested during the drive, wherein the tip information comprises information related to improving the weakest skill; and
    start a timer to time the drive, wherein the timer is started in response to the selection.

12. The non-transitory computer readable storage medium of claim 1, wherein the computer-executable instructions, when executed, further cause the computing device to:
    prompt a user of the computing device to provide a score for each of a plurality of test skills to be tested during a drive performed by the driver.

13. A method, comprising:
    receiving, via an input interface by a computing device comprising the input interface, a display, and an accelerometer, gyroscope, or global positioning system receiver, a target test date for a driver to obtain a driver's license;
    determining, by the computing device and based on the target test date, a total number of days from a current date to the target test date; and
    communicating with one or more additional computing devices to establish a communicative connection and a reference time;
    activating the accelerometer, gyroscope, or global positioning system receiver to detect first drive data while the driver is driving a vehicle;
    receiving, through the communicative connection and from the one or more additional computing devices, second drive data;
    correlating, based on the reference time, the first drive data and the second drive data to produce final drive data;
    analyzing the final drive data to determine a skill level of the driver; and
    outputting, on the display and based on the total number of days and the skill level of the driver, an indication of whether the driver is on track to reach a target skill level by the target test date, wherein the indication comprises:
    displaying a circle graph that is shaded in a clockwise direction according to the skill level of the driver; and
    displaying a marker over a shaded portion of the circle graph, wherein the marker indicates an expected skill level on a current date.

14. The method of claim 13, further comprising:
    prior to the outputting, receiving a plurality of scores for a plurality of driving skills, respectively; and
    determining, by the computing device and based on the plurality of scores, the skill level of the driver.

15. The method of claim 13, further comprising:
    dividing the total number of days into a plurality of groups, wherein each of the plurality of groups is associated with a skill level.

16. An apparatus comprising:
    an accelerometer, gyroscope, or global positioning system receiver:
    a processor; and
    memory storing computer-executable instructions that, when executed by the processor, cause the apparatus to:
    receive a target driver's license test date associated with a driver;
    determine, based on the target driver's license test date, a total number of days to prepare for a driver's license test date; and
    communicate with one or more additional computing devices to establish a
    communicative connection and a reference time;
    activate the accelerometer, gyroscope, or global positioning system receiver to
    detect first drive data while the driver is driving a vehicle;
    receive, through the communicative connection and from the one or more additional computing devices, second drive data;
    correlate, based on the reference time, the first drive data and the second drive data to produce final drive data;
    analyze the final drive data to determine a skill level of the driver;
    indicate that the driver is on track to reach a target skill level by the target driver's license test date by:
    displaying a circle graph that is shaded in a clockwise direction according to the skill level of the driver; and
    displaying a marker over a shaded portion of the circle graph, wherein the marker indicates an expected skill level on a current date.

17. The apparatus of claim 16, wherein the memory stores further computer-executable instructions that, when executed, cause the apparatus to:
    prompt a user for the target driver's license test date during a registration of the computer-executable instructions.

18. The apparatus of claim 16, wherein the memory stores further computer-executable instructions that, when executed, cause the apparatus to:
    divide the total number of days into a plurality of groups, wherein each of the plurality of groups is associated with a level.

19. The apparatus of claim 18, wherein the total number of days is divided according to an algorithm that sets forth percentages of the total number of days to be assigned to the plurality of groups, respectively.

20. The apparatus of claim 19, wherein at least two of the percentages are different, and wherein the total number of days corresponds to a number of days between a date on which the driver receives a driver's permit and the target driver's license test date.

* * * * *